ered at the recorded state, the output is read.
This result is compared with the expected output in
computer memory. If correspondence between memory
output and register output is found, the next sequential
set of test commands is acted upon. If correspondence is
not found, a subroutine search is automatically conducted to locate the error. The disclosed self-test subsystem is duplicated in four separate divisions with each
division testing one of the four duplicate protection
systems. The three remaining and idle divisions constantly monitor the active subsystem's operation. The
end result is an overall system which reduces the mean
time to discover error, thus minimizing mean time to
repair and maximizing protection system availability
and safety. The separation of the protection system into
four duplicate divisions is not dependent on the disclosed invention and the invention may be applied to
protection systems with a different number of divisions.

United States Patent [19]

Dennis et al.

[11] Patent Number: 4,517,154
[45] Date of Patent: May 14, 1985

[54] SELF-TEST SUBSYSTEM FOR NUCLEAR REACTOR PROTECTION SYSTEM

[75] Inventors: Ulric E. Dennis; Dennis W. Hollenbeck; John A. Kirtland; Kenneth B. Stackhouse; Patricia A. Wilson; William D. Hill, all of San Jose; David D. Akers, Los Gatos; Elmer D. Hill, Sacramento, all of Calif.

[73] Assignee: General Electric Company, San Jose, Calif.

[21] Appl. No.: 402,053

[22] Filed: Jul. 27, 1982

[51] Int. Cl.³ .............................................. G21C 17/00
[52] U.S. Cl. .................................... 376/259; 376/277; 364/550; 364/579; 364/580; 371/20
[58] Field of Search ............... 376/217, 215, 259, 216, 376/277; 364/550, 551, 579, 580; 371/20, 27; 324/73 AT

[56] References Cited

U.S. PATENT DOCUMENTS

| 3,979,256 | 9/1976 | Keefe | 376/215 |
| 4,055,801 | 10/1977 | Pike et al. | 324/73 AT |
| 4,080,251 | 3/1978 | Musick | 376/217 |
| 4,292,129 | 9/1981 | Barry | 376/217 |
| 4,318,778 | 3/1982 | Musick | 376/216 |
| 4,330,367 | 5/1982 | Musick | 376/245 |
| 4,354,268 | 10/1982 | Michel et al. | 371/20 |
| 4,422,140 | 12/1983 | Keats | 376/217 |

OTHER PUBLICATIONS

Matloob et al.; "Use of Microprocessors in Reactor Guard Line Circuits"; Nucl. Energy, 1980, vol. 19, Feb. No. 1, 53–59.
Bologna et al.; "A Computerized Protection System for a Fast Research Reactor"; IEEE Tran. on Nuc. Sci., vol. NS–27, No. 1, 2/80.
IEEE Transactions on Nuclear Science, vol. NS–27, Feb. 1980.
Nuclear Energy, 1980, vol. 19, Feb., No. 1, 53–59.
Nuclear Engineering International, Jul. 1982, 41–43.

Primary Examiner—Donald P. Walsh
Attorney, Agent, or Firm—Iver J. James, Jr.; Samuel E. Turner; William Michael Hynes

[57] ABSTRACT

A self-test system for a nuclear power plant, nuclear reactor protection system is disclosed. Nuclear protection systems are the electronic controls, typically including circuit cards, located intermediate between sensors (as for detecting core overheat) and a control (as for providing rod injection to shut down a reactor). Constant surveillance of the nuclear system protection system is provided by a microprocessor that serially addresses protection system circuit cards and loads them at pre-determined input points with test commands. The addressed cards are thereafter simultaneously activated by a system-wide command. The test command is a pulse which is so short in duration that its affect is transparent to the system and cannot cause overall system operation. The pulse passes through the actuating electrical components to verify, on the real actuating path, the operating integrity of the system. After an appropriate response interval, the output state of the system is recorded in system-wide resident registers. Thereafter, with response data contained in these registers frozen at the recorded state, the output is read.

29 Claims, 53 Drawing Figures

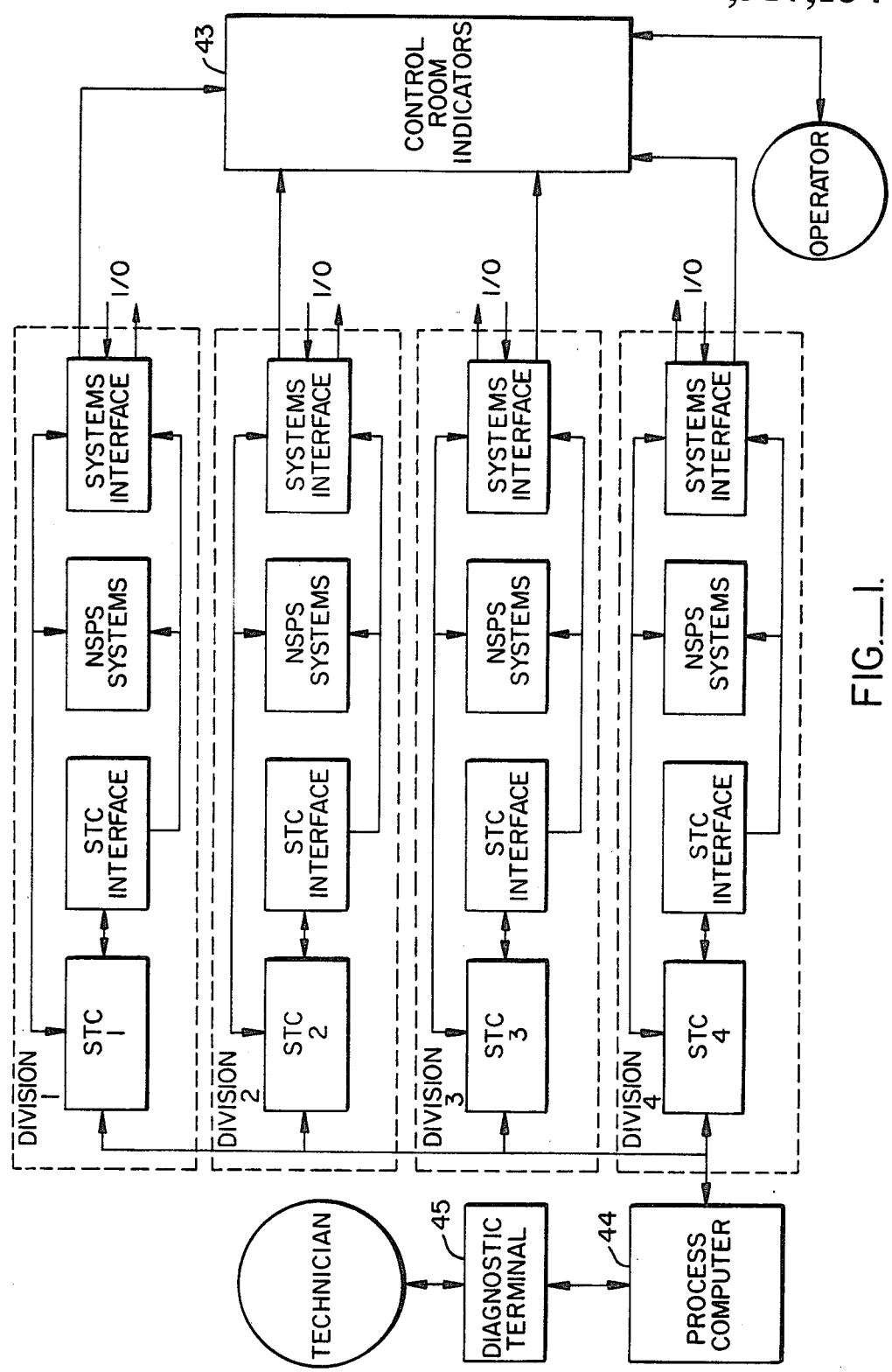
FIG._1.

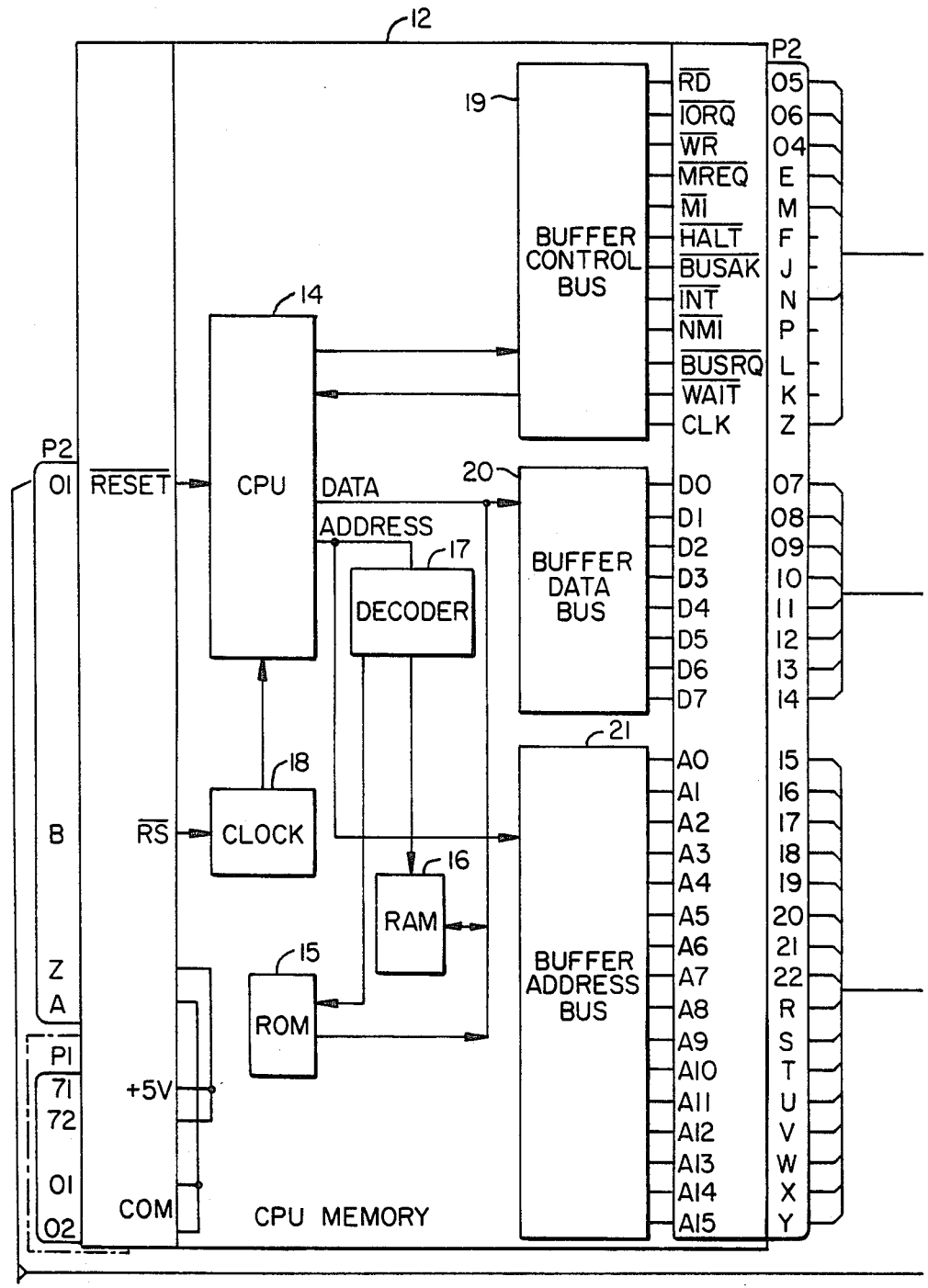
FIG._2A.

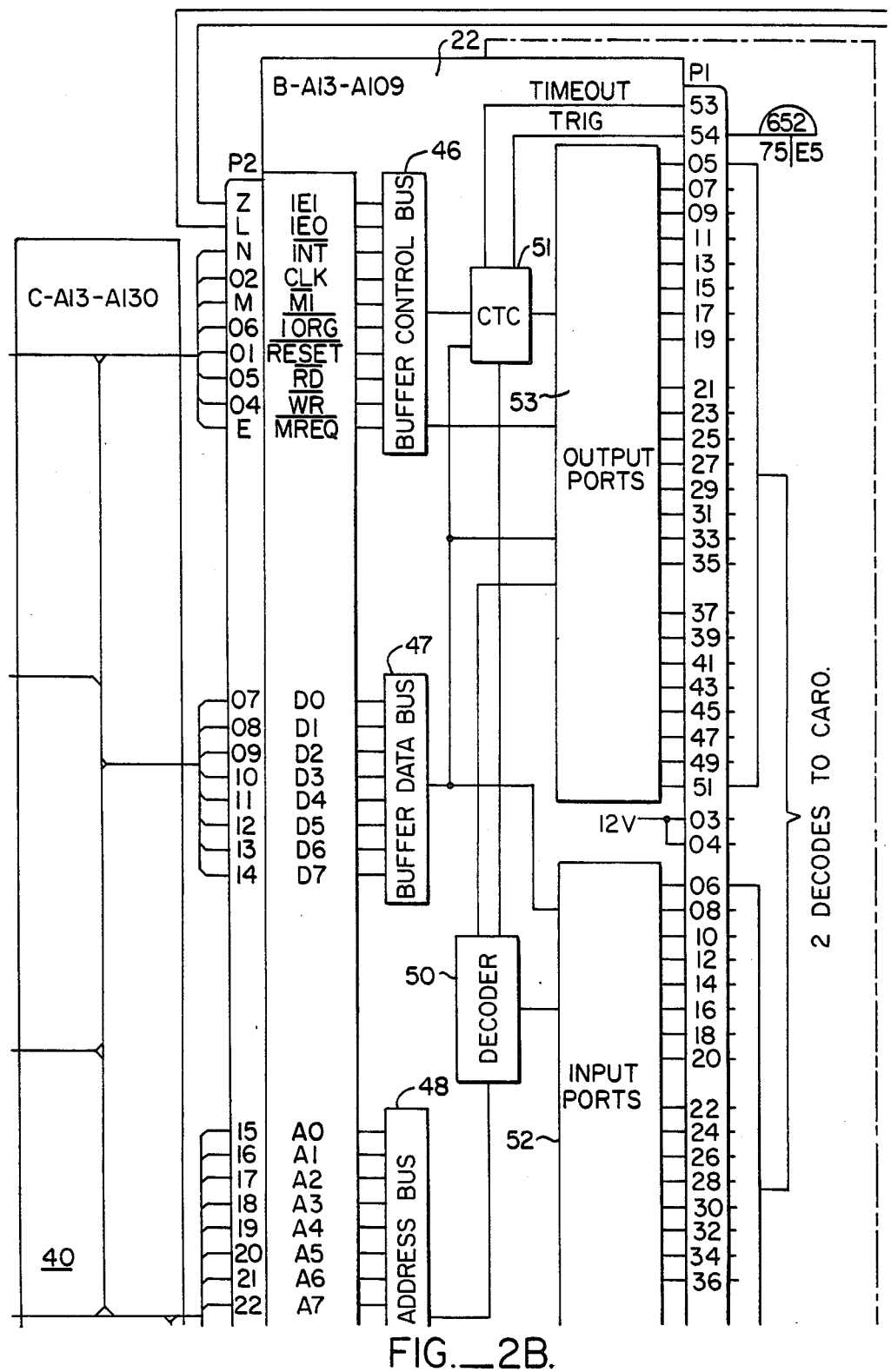
FIG._2B.

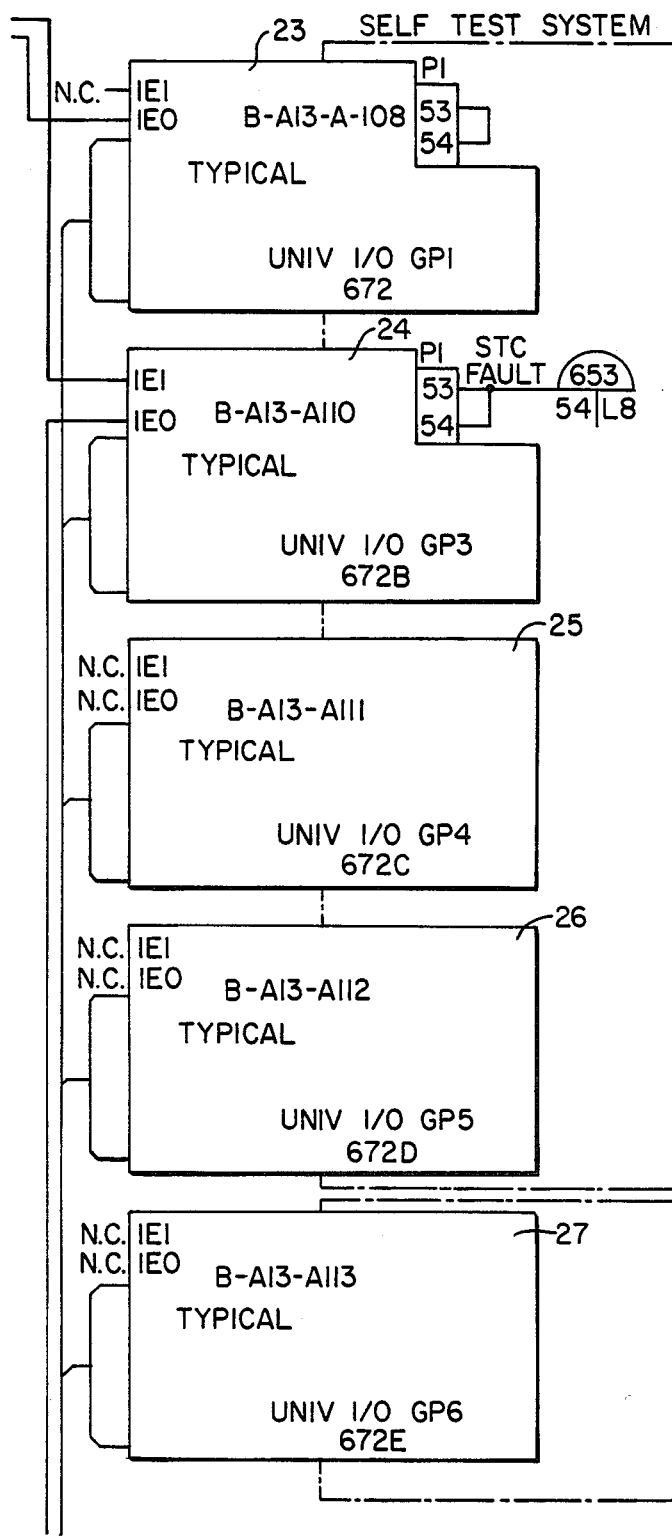
FIG._2C.

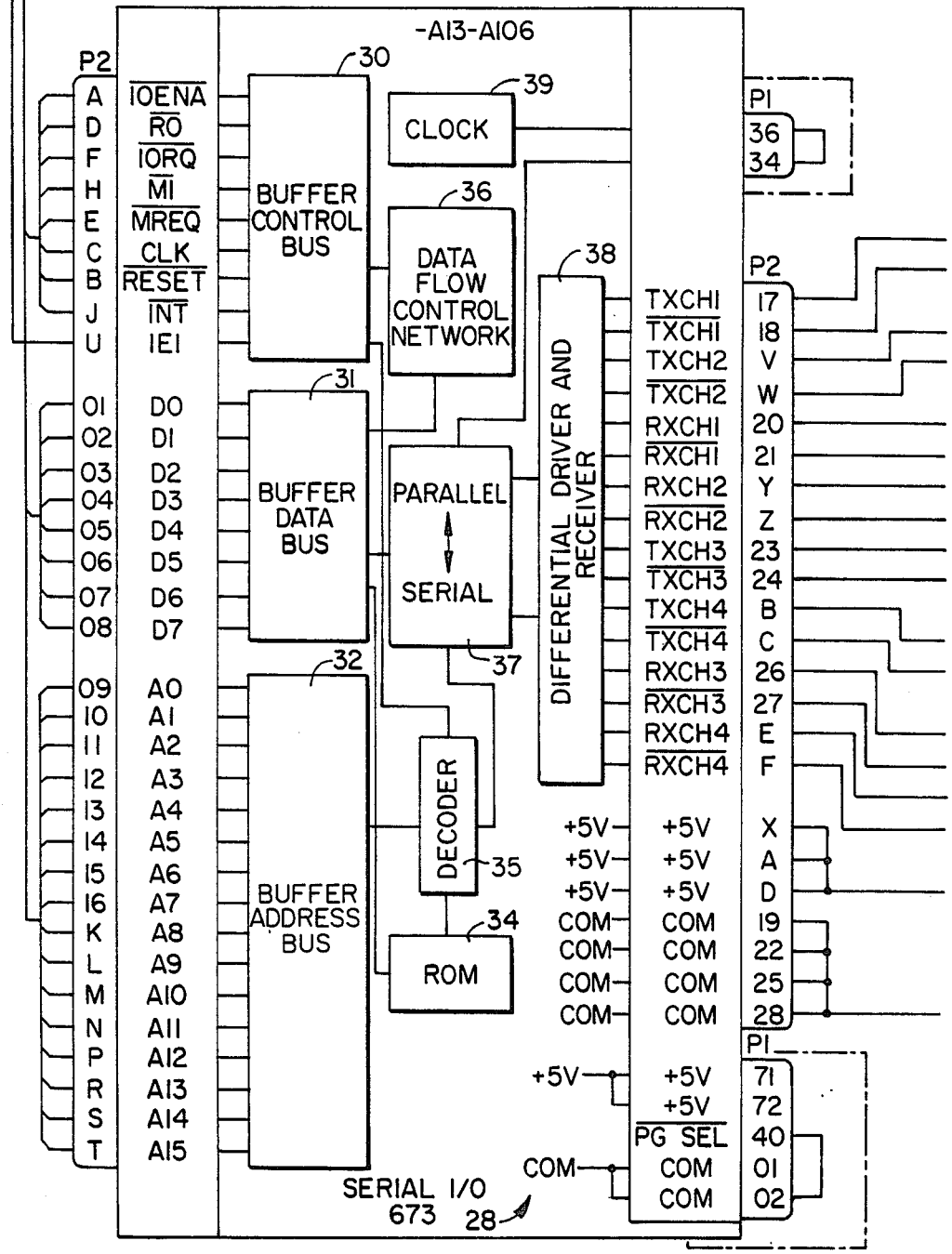
FIG._2D.

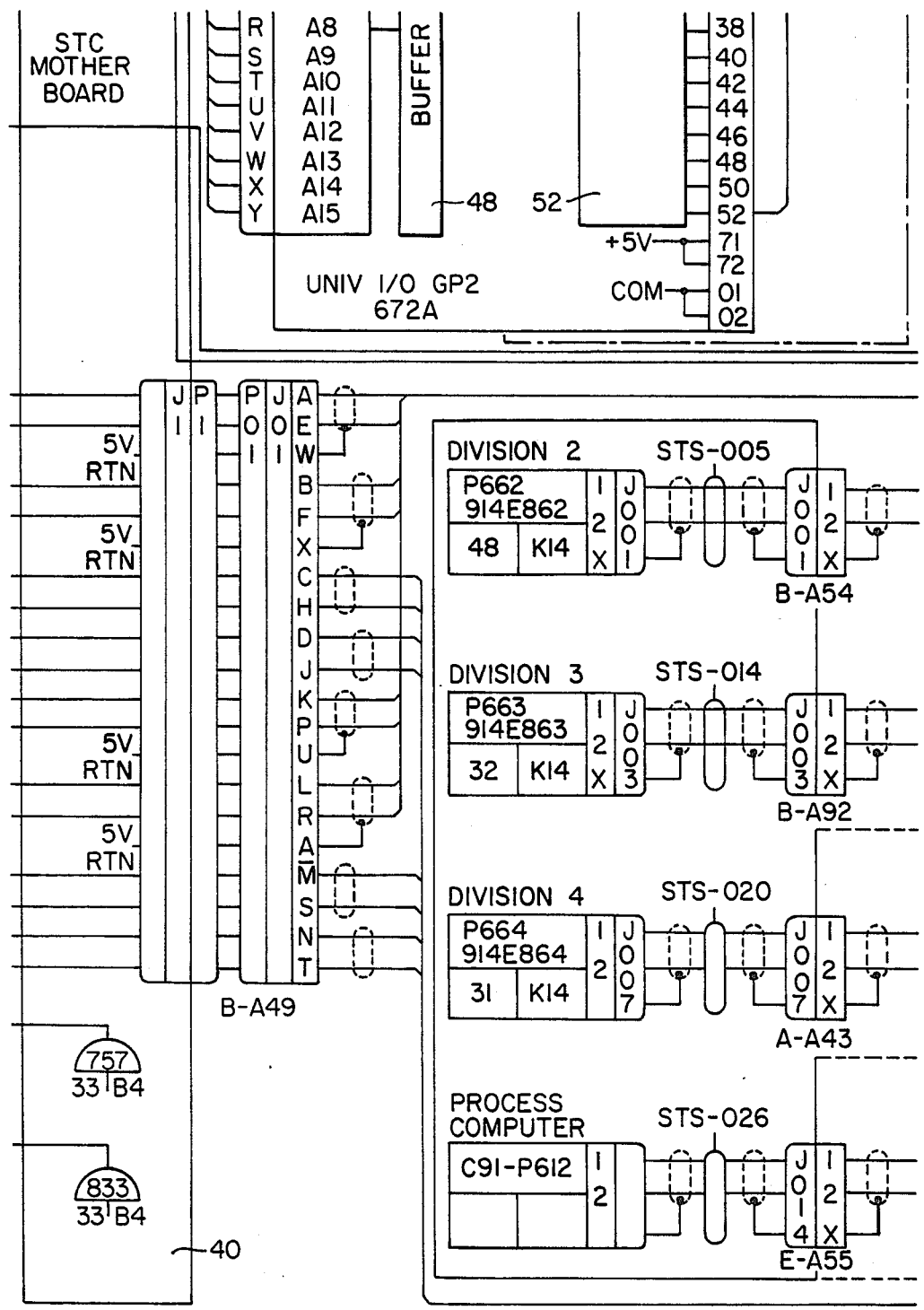
FIG._2E.

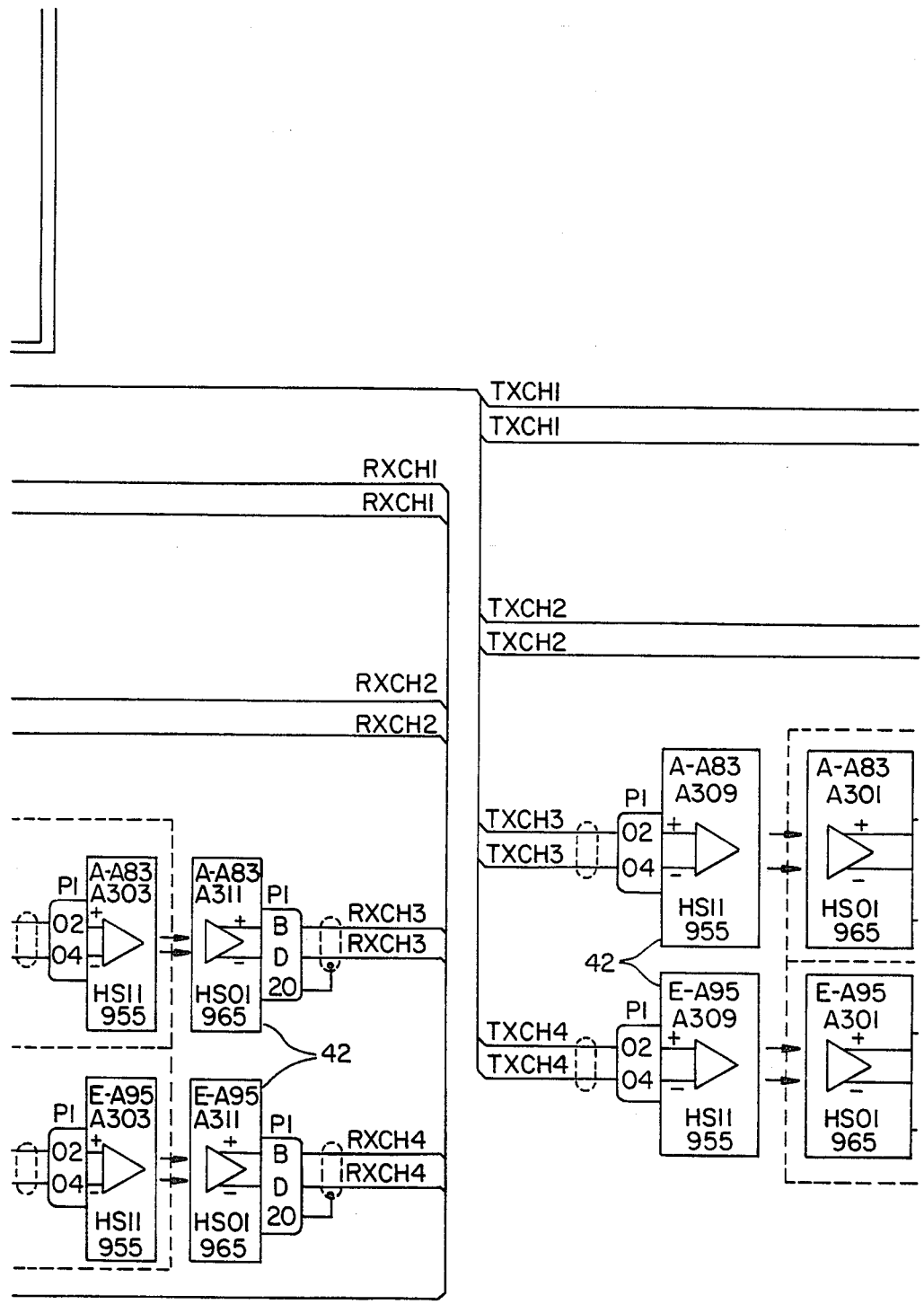
FIG._2F.

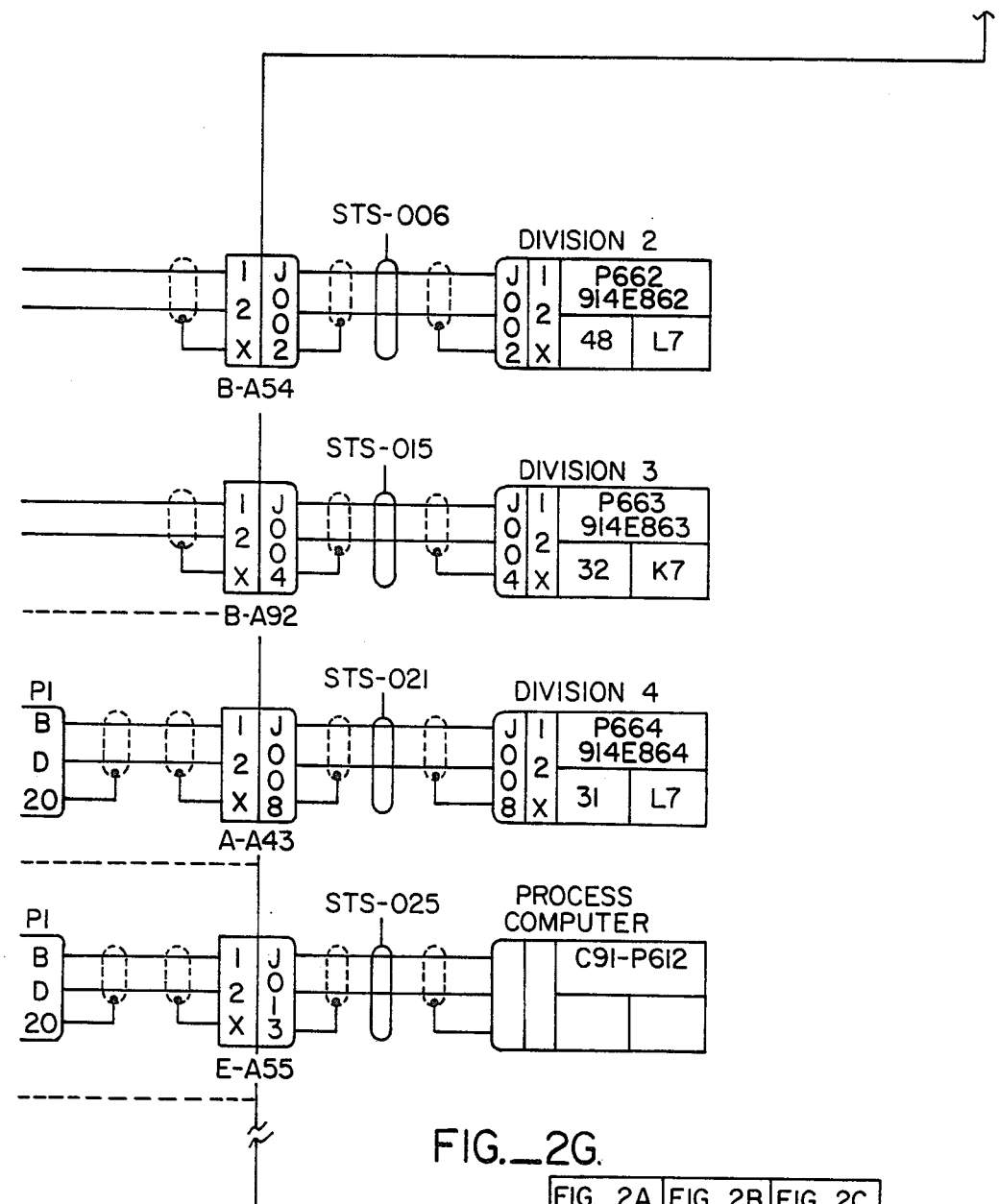
FIG._2G.
FIG._2H.

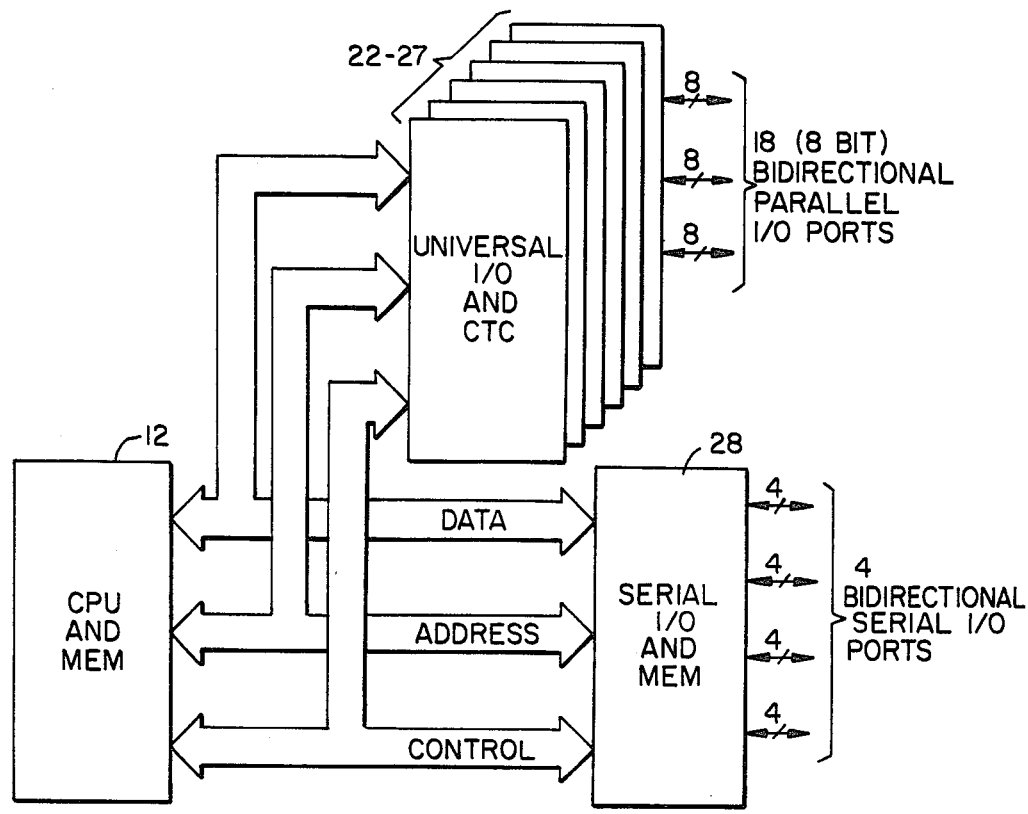
FIG._3.

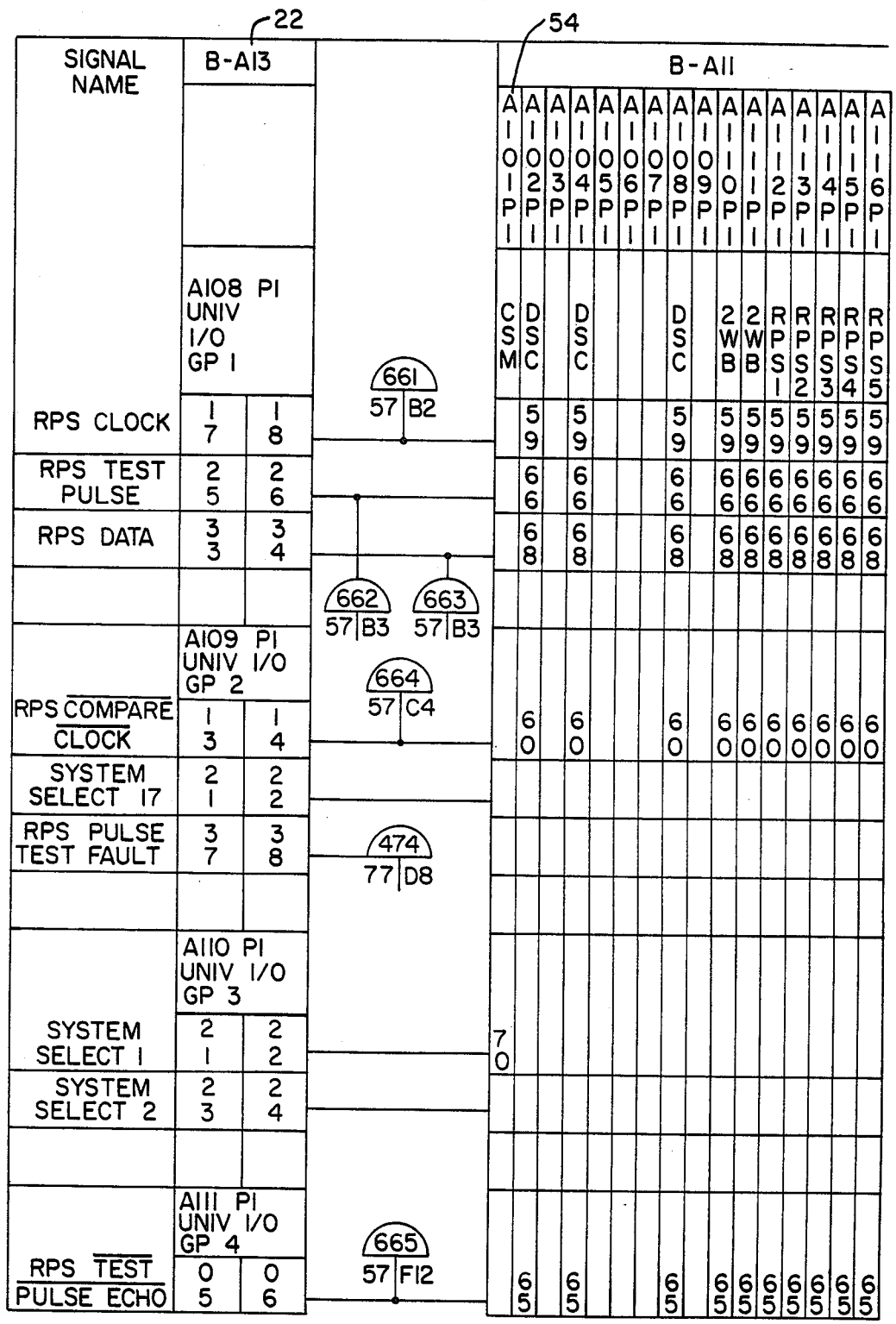
FIG._4A.

STC PIN CONNECTIONS FOR RPS

| | A117P1 | A118P1 | A119P1 | A121P1 | A123P1 | A125P1 | A127P1 | | A101P1 | A102P1 | A103P1 | A104P1 | A105P1 | A106P1 | A107P1 | A108P1 | A109P1 | A110P1 | A111P1 | A112P1 | A113P1 | A114P1 | A115P1 | A116P1 | A117P1 | A118P1 | A119P1 | A121P1 | A123P1 | A125P1 | A127P1 | |
|---|---|---|---|---|---|---|---|---|---|---|---|---|---|---|---|---|---|---|---|---|---|---|---|---|---|---|---|---|---|---|---|---|
| | RPS6 | RPS7 | ILD | DCLD | DCLD | DCLD | | | CSM | DSC | DSC | | | DSC | 2WB | 2WB | | 2/4 | 2/4 | 2/4 | | TD | TD | 2WB** | DCLD** | ACLD | DCLD | | | | |
| A | 59 | 59 | 59 | 59 | 59 | 59 | | | 59 | | 59 | | | 59 | 59 | 59 | | 59 | 59 | 59 | | 59 | 59 | | | 59 | 59 | | | | |
| C | 66 | 66 | 66 | 66 | 66 | 66 | | | 66 | | 66 | | | 66 | 66 | 66 | | 66 | 66 | 66 | | 66 | 66 | | | 66 | 66 | | | | |
| Y | 68 | 68 | 68 | 68 | 68 | 68 | | | 68 | | 68 | | | 68 | 68 | 68 | | 68 | 68 | 68 | | 68 | 68 | | | 68 | 68 | | | | |
| K | 60 | 60 | 60 | 60 | 60 | 60 | | | 60 | | 60 | | | 60 | 60 | 60 | | 60 | 60 | 60 | | 60 | 60 | | | 60 | 60 | | | | |
| T | | | | | | | | | 70 | | | | | | | | | | | | | | | | | | | | | | |
| U | 65 | 65 | 65 | 65 | 65 | 65 | | | 65 | | 65 | | | 65 | 65 | 65 | | 65 | 65 | 65 | | 65 | 65 | | | 65 | 65 | | | | |

FIG._4B.

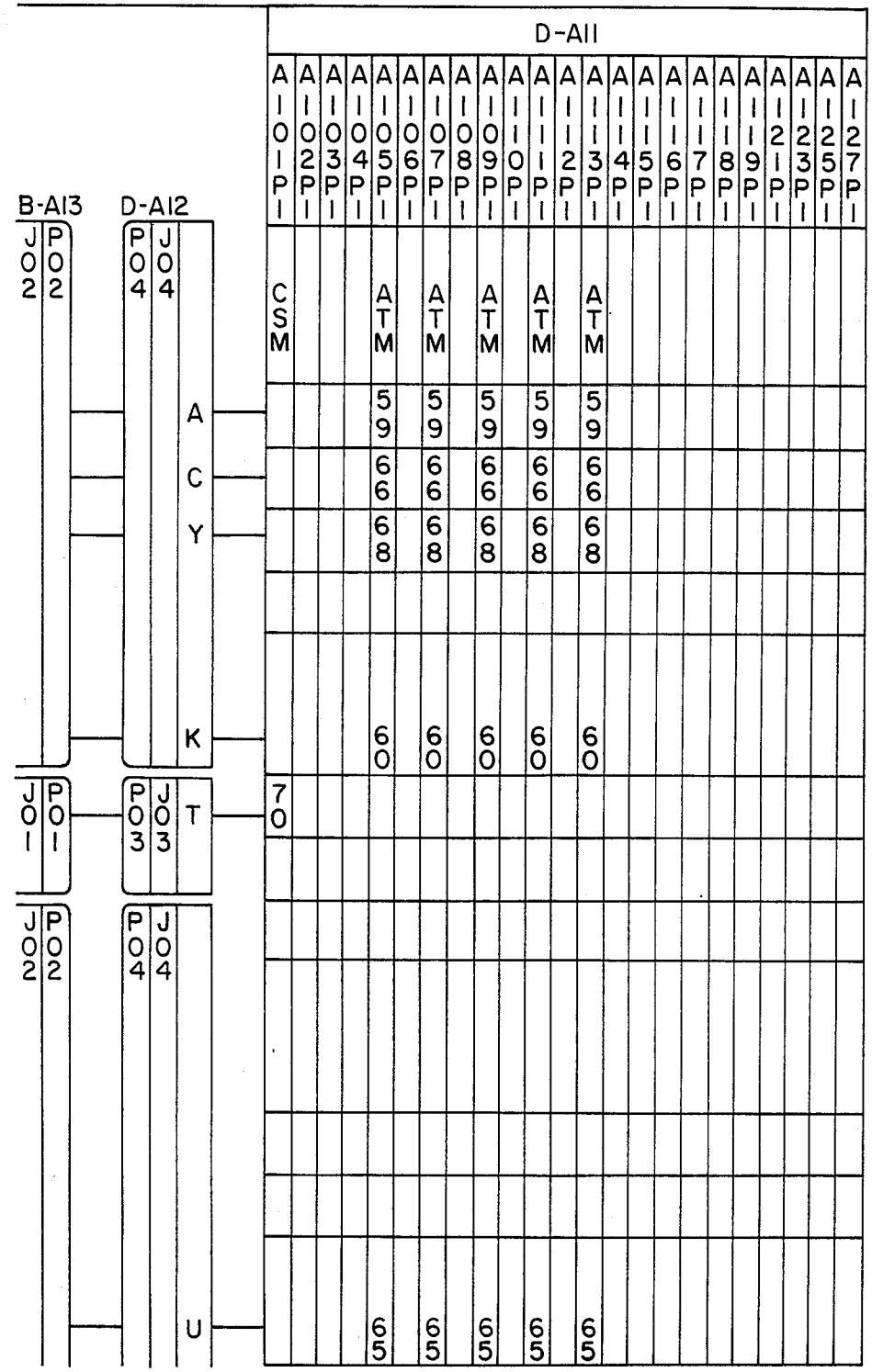
FIG._4C.

OPTION 1 - DC LOW SENSE: >20 MA
CONNECT:
| | | | |
|---|---|---|---|
| CIRCUIT A | P2-17 | TO | P2-S |
| CIRCUIT B | P2-11 | TO | P2-M |
| CIRCUIT C | P2-6 | TO | P2-F |
| CIRCUIT D | P2-W | TO | P2-21 |

OPTION 2 - DC HIGH SENSE: >200 MA
CONNECT:
| | | | |
|---|---|---|---|
| CIRCUIT A | P2-17 | TO | P2-R |
| CIRCUIT B | P2-11 | TO | P2-L |
| CIRCUIT C | P2-6 | TO | P2-E |
| CIRCUIT D | P2-W | TO | P2-Y |

OPTION 3 - GATE SENSE
CONNECT:
| | | | |
|---|---|---|---|
| CIRCUIT A | P2-N | TO | P2-13 |
| | P2-P | TO | P2-17 |
| CIRCUIT B | P2-H | TO | P2-J |
| | P2-K | TO | P2-11 |
| CIRCUIT C | P2-A | TO | P2-C |
| | P2-D | TO | P2-G |
| CIRCUIT D | P2-T | TO | P2-V |
| | P2-18 | TO | P2-W |

FIG._4D.

| FIG. 4A. | FIG. 4B. | FIG. 4C. | FIG. 4D. |
|---|---|---|---|
| FIG. 4E. | FIG. 4F. | FIG. 4G. | |

FIG._4H.

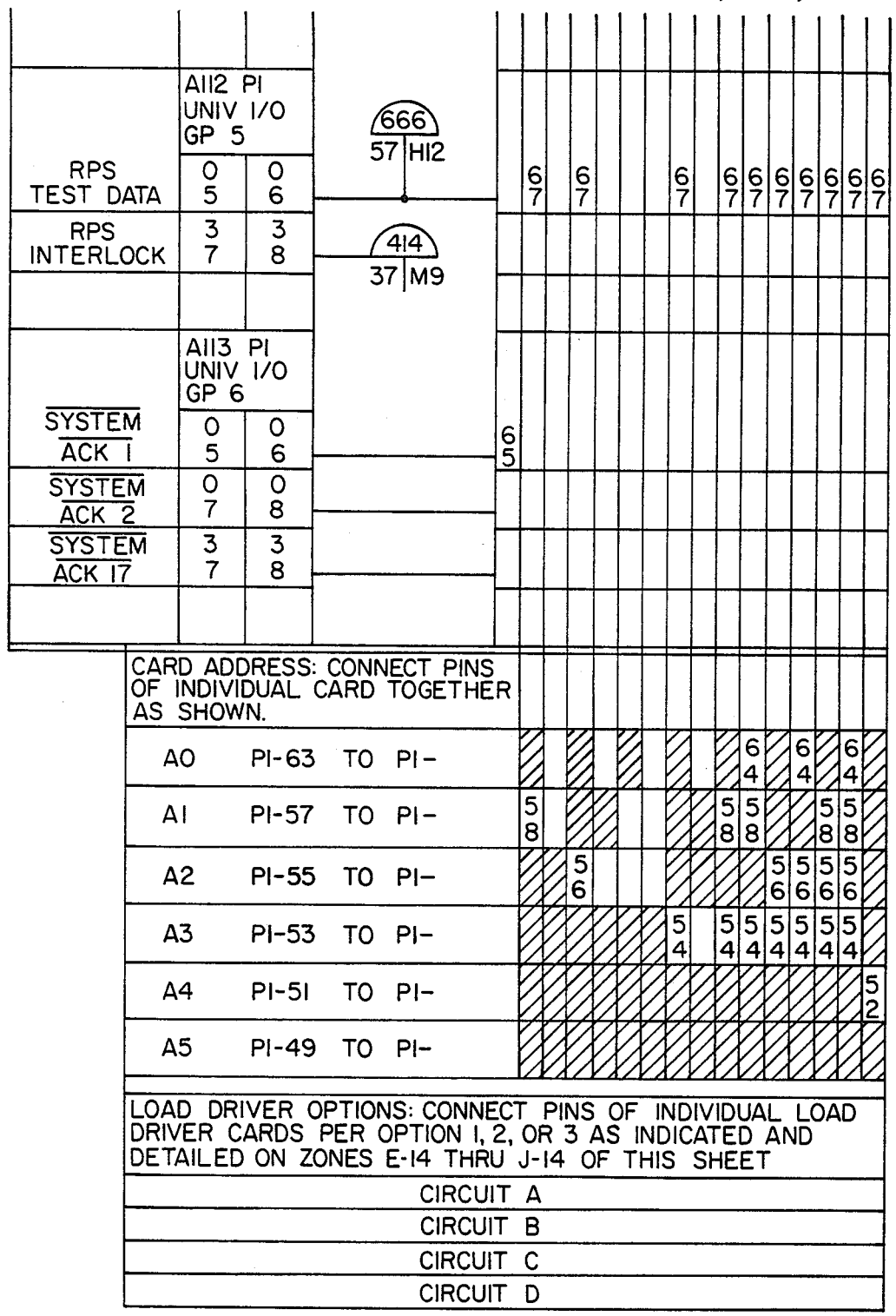
FIG._4E.

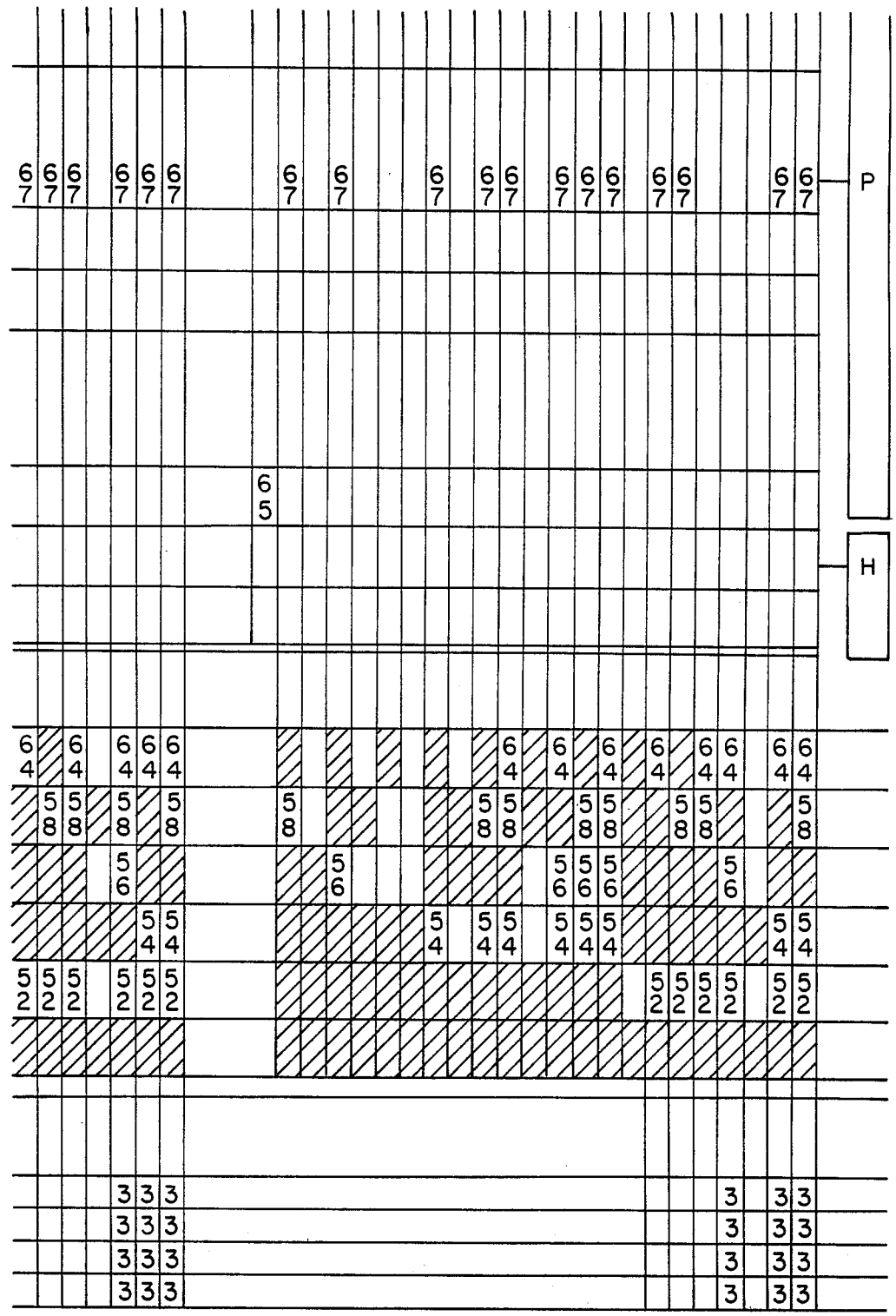
FIG._4F.

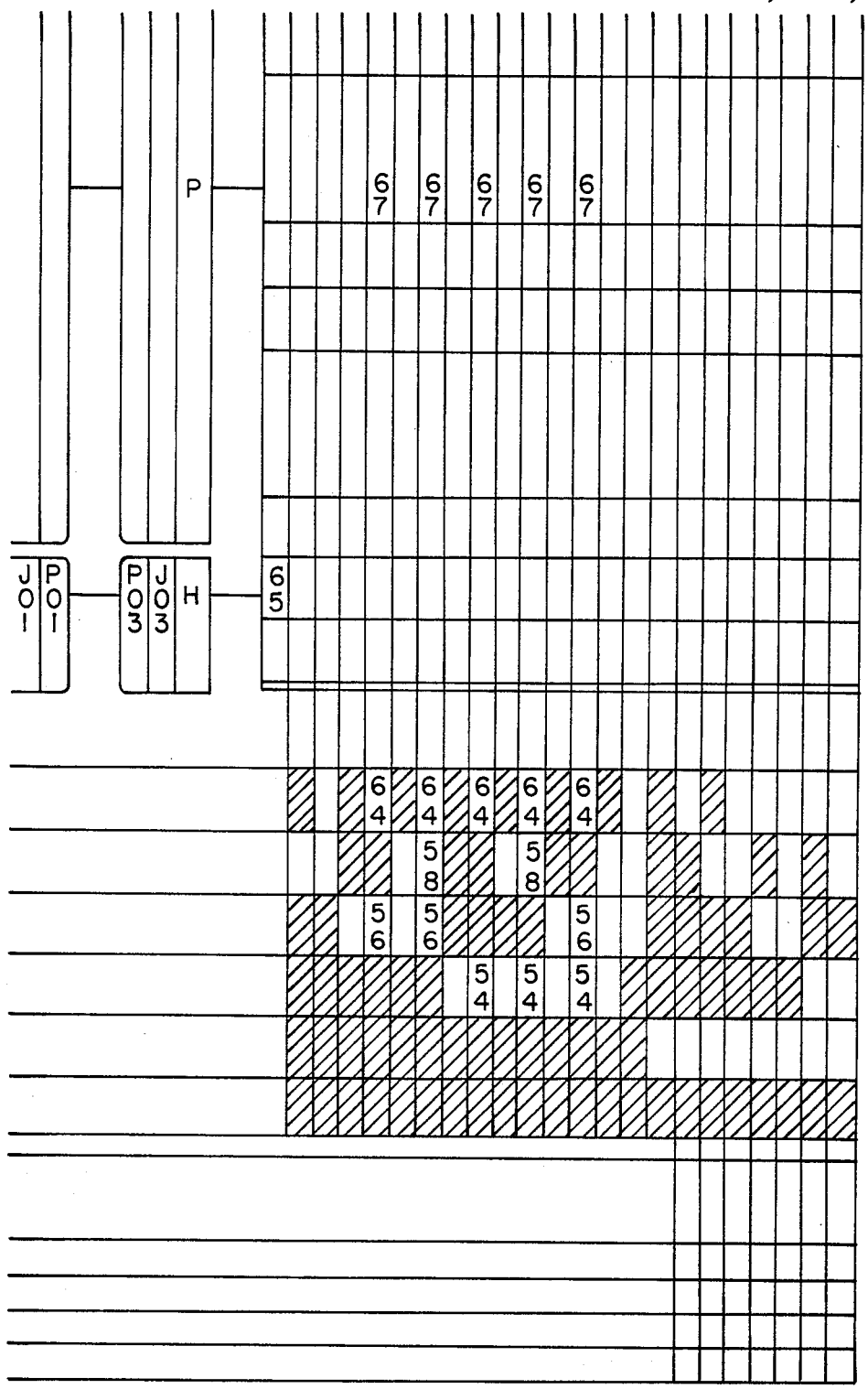
FIG._4G.

| SIGNAL NAME | 22 | 24 | A101PI | A102PI | A103PI | A104PI | A105PI | A106PI | A107PI | A108PI | A109PI | A110PI | A111PI | A112PI | A113PI | A114PI | A115PI | A116PI | A117PI | A118PI | A119PI | A121PI | A123PI | A125PI | A127PI |
|---|---|---|---|---|---|---|---|---|---|---|---|---|---|---|---|---|---|---|---|---|---|---|---|---|---|
|  | A108 PI UNIV I/O GP 1 | CSM |  |  |  |  |  |  |  |  |  |  |  |  |  |  |  |  | 2WSS** | 2WSS** | 2WSS** | 2WSS** | 2WSS** | PWRM | PWRM |
| SERIAL ADDRESS | 41 | 42 | 61 |  |  |  |  |  |  |  |  |  |  |  |  |  |  |  |  |  |  |  |  |  |  |
| SELECT STROBE | 43 | 44 | 62 |  |  |  |  |  |  |  |  |  |  |  |  |  |  |  |  |  |  |  |  |  |  |
| ADDRESS CLOCK | 45 | 46 | 63 |  |  |  |  |  |  |  |  |  |  |  |  |  |  |  |  |  |  |  |  |  |  |
| STC CLOCK | 47 | 48 | 59 |  |  |  |  |  |  |  |  |  |  |  |  |  |  |  | 59 | 59 | 59 | 59 | 59 | 59 | 59 |
| STC TEST PULSE | 49 | 50 |  |  |  |  |  |  |  |  |  |  |  |  |  |  |  |  | 66 | 66 | 66 | 66 | 66 |  |  |
|  | A110 PI UNIV I/O GP 3 |  |  |  |  |  |  |  |  |  |  |  |  |  |  |  |  |  |  |  |  |  |  |  |  |
| STC COMPARE CLOCK | 17 | 18 | 60 |  |  |  |  |  |  |  |  |  |  |  |  |  |  |  | 60 | 60 | 60 | 60 | 60 | 60 | 60 |
| STC DATA | 19 | 20 |  |  |  |  |  |  |  |  |  |  |  |  |  |  |  |  | 68 | 68 | 68 | 68 | 68 | 68 | 68 |
| SYSTEM SELECT 3 | 25 | 26 | 70 |  |  |  |  |  |  |  |  |  |  |  |  |  |  |  |  |  |  |  |  |  |  |
|  | A111 PI UNIV I/O GP 4 |  |  |  |  |  |  |  |  |  |  |  |  |  |  |  |  |  |  |  |  |  |  |  |  |
| STC STROBE ECHO | 19 | 20 | 64 |  |  |  |  |  |  |  |  |  |  |  |  |  |  |  |  |  |  |  |  |  |  |
| STC TEST PULSE ECHO | 23 | 24 |  |  |  |  |  |  |  |  |  |  |  |  |  |  |  |  | 65 | 65 | 65 | 65 | 65 |  |  |
| STC INTERLOCK | 25 | 26 | (473) 52/F13 |  |  |  |  |  |  |  |  |  |  |  |  |  |  |  |  |  |  |  |  |  |  |
|  | A112 PI UNIV I/O GP 5 |  |  |  |  |  |  |  |  |  |  |  |  |  |  |  |  |  |  |  |  |  |  |  |  |

FIG._5A.

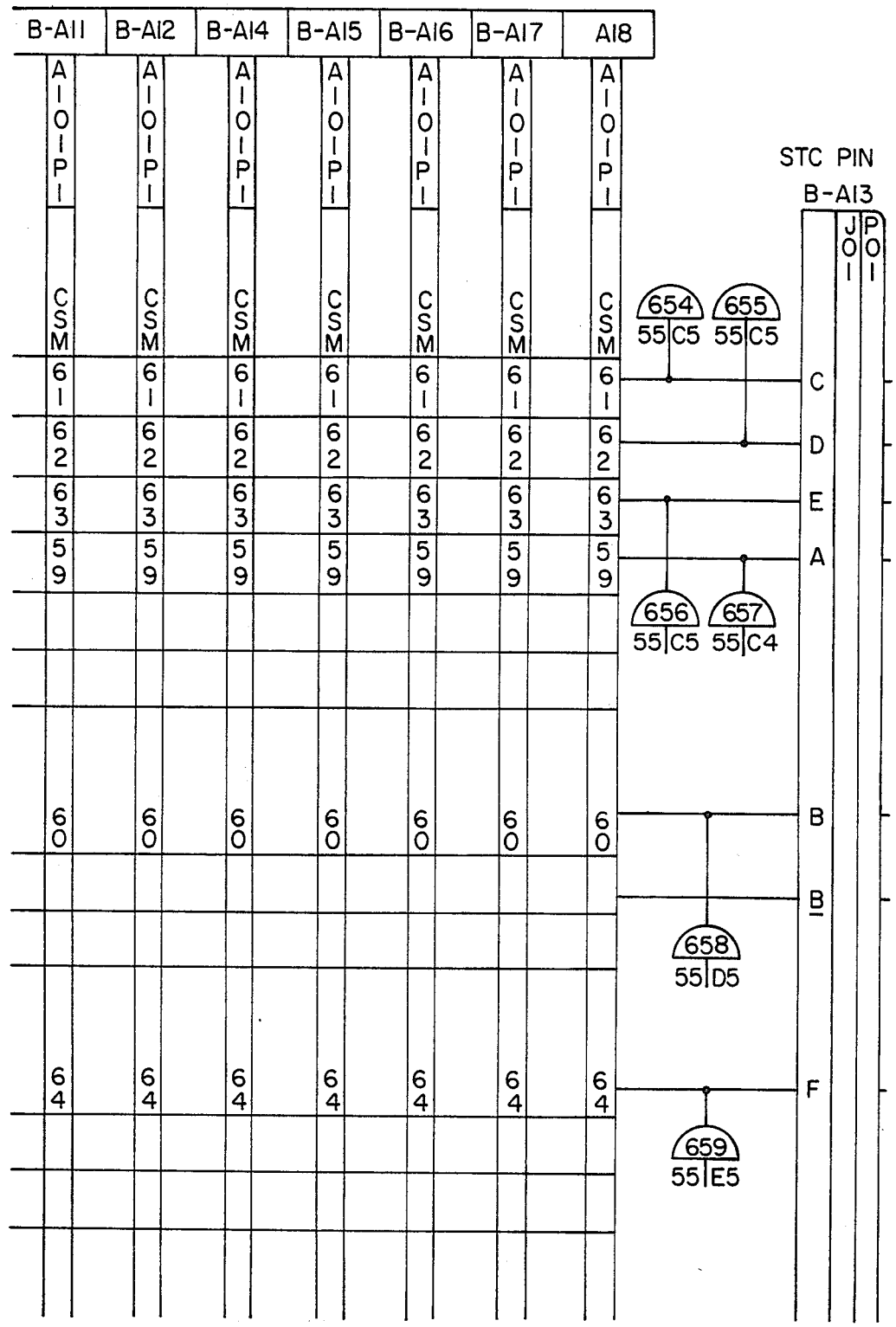
FIG._5B.

FIG._5C.

| STC (PM-CSM) TEST DATA | 1 9 | 2 0 | 6 7 | | | | | | | | | | | | | | 6 7 | 6 7 | 6 7 | 6 7 | 6 7 | 6 7 |
|---|---|---|---|---|---|---|---|---|---|---|---|---|---|---|---|---|---|---|---|---|---|---|
| | A113 PI UNIV I/O GP 6 | | | | | | | | | | | | | | | | | | | | | |
| SYSTEM ACK 3 | 0 9 | 1 0 | 6 5 | | | | | | | | | | | | | | | | | | | |
| CARD ADDRESS: CONNECT PINS OF INDIVIDUAL CARD TOGETHER AS SHOWN. | | | | | | | | | | | | | | | | | | | | | | |
| A0 PI-63 TO PI- | | | | ▨ | | ▨ | | ▨ | | ▨ | | ▨ | | ▨ | | 6 4 | ▨ | 6 4 | 6 4 | 6 4 | 6 4 | 6 4 |
| A1 PI-57 TO PI- | | | | ▨ | | ▨ | | ▨ | | ▨ | | ▨ | | ▨ | | 5 8 | 5 8 | ▨ | 5 8 | ▨ | 5 8 | ▨ |
| A2 PI-55 TO PI- | | | | ▨ | | | ▨ | ▨ | | | ▨ | ▨ | | | ▨ | ▨ | | | 5 6 | 5 6 | ▨ | ▨ |
| A3 PI-53 TO PI- | | | | ▨ | ▨ | ▨ | ▨ | | | | | ▨ | ▨ | ▨ | ▨ | | | | | | 5 4 | 5 4 |
| A4 PI-51 TO PI- | | | | ▨ | ▨ | ▨ | ▨ | ▨ | ▨ | ▨ | ▨ | | | | | | | 5 2 | 5 2 | 5 2 | 5 2 | 5 2 | 5 2 | 5 2 |
| A5 PI-49 TO PI- | | | | ▨ | ▨ | ▨ | ▨ | ▨ | ▨ | ▨ | ▨ | ▨ | ▨ | ▨ | ▨ | ▨ | ▨ | ▨ | ▨ | ▨ | ▨ | ▨ |

FIG._5D.

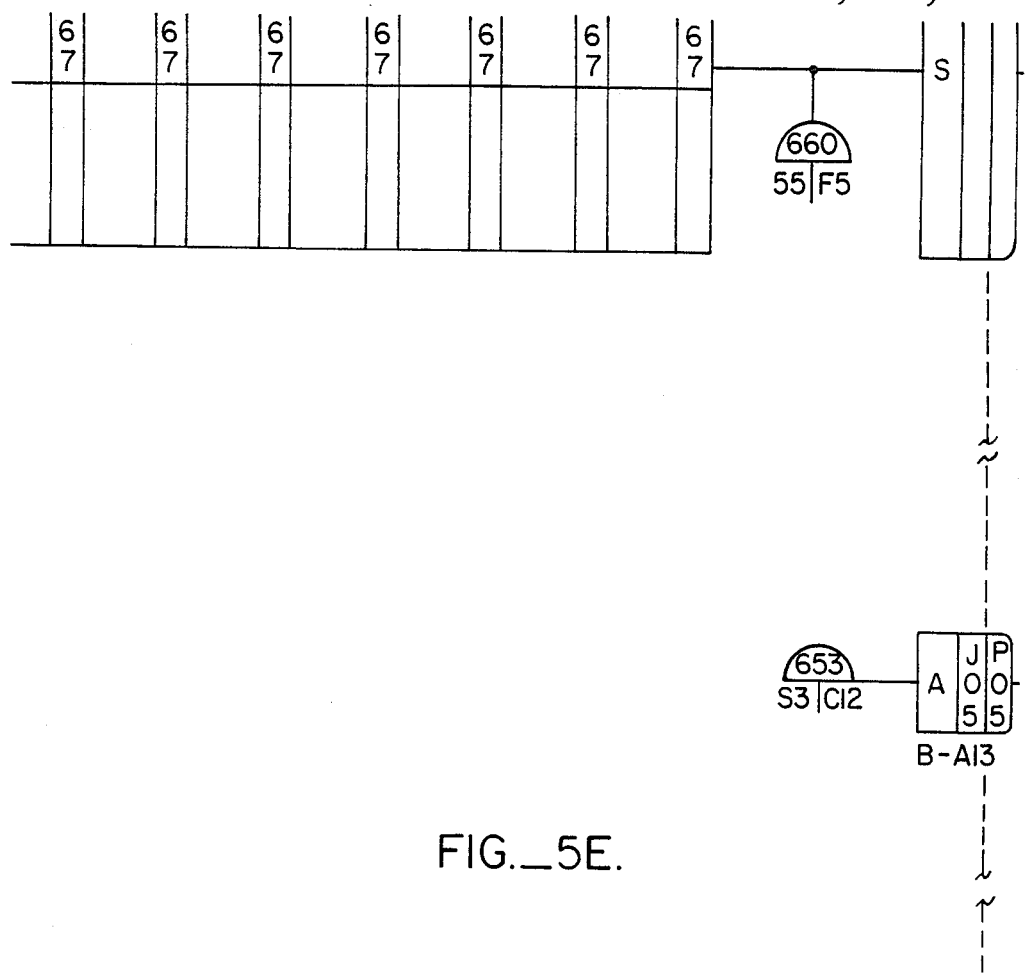
FIG._5E.

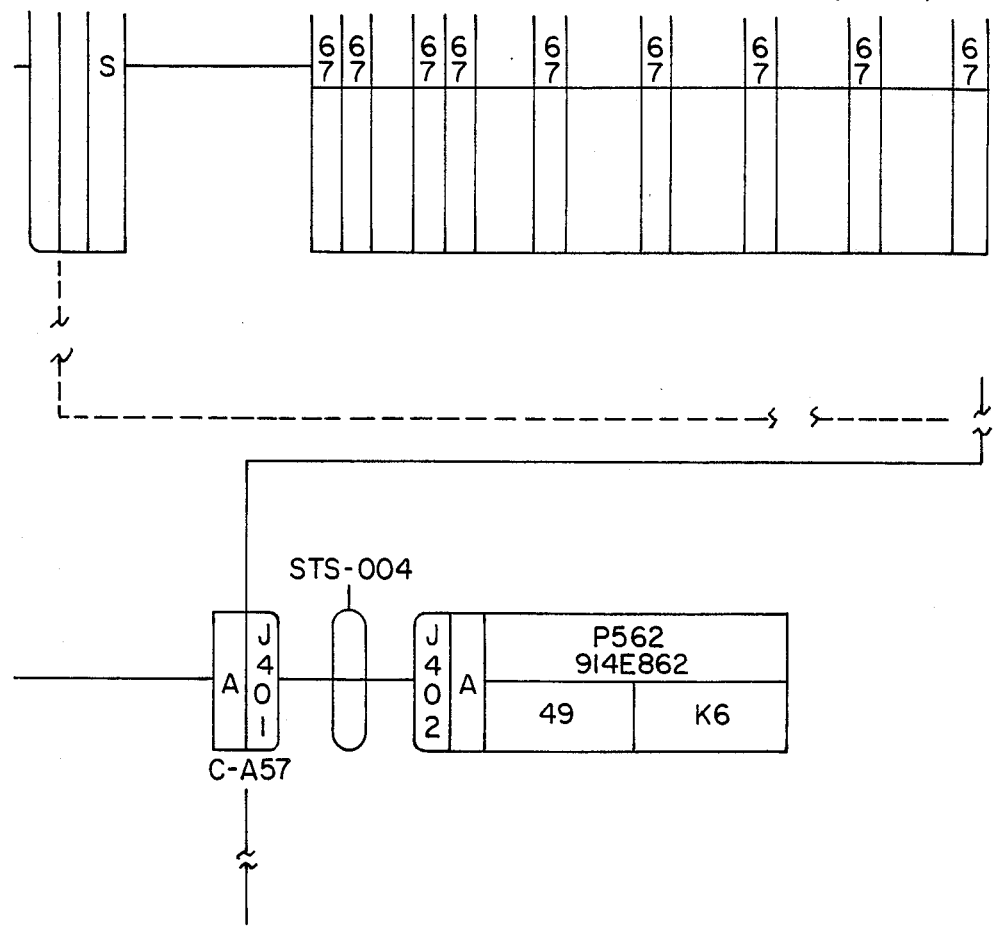
FIG._5F.
| FIG. 5A. | FIG. 5B. | FIG. 5C. |
| FIG. 5D. | FIG. 5E. | FIG. 5F. |
FIG._5G.

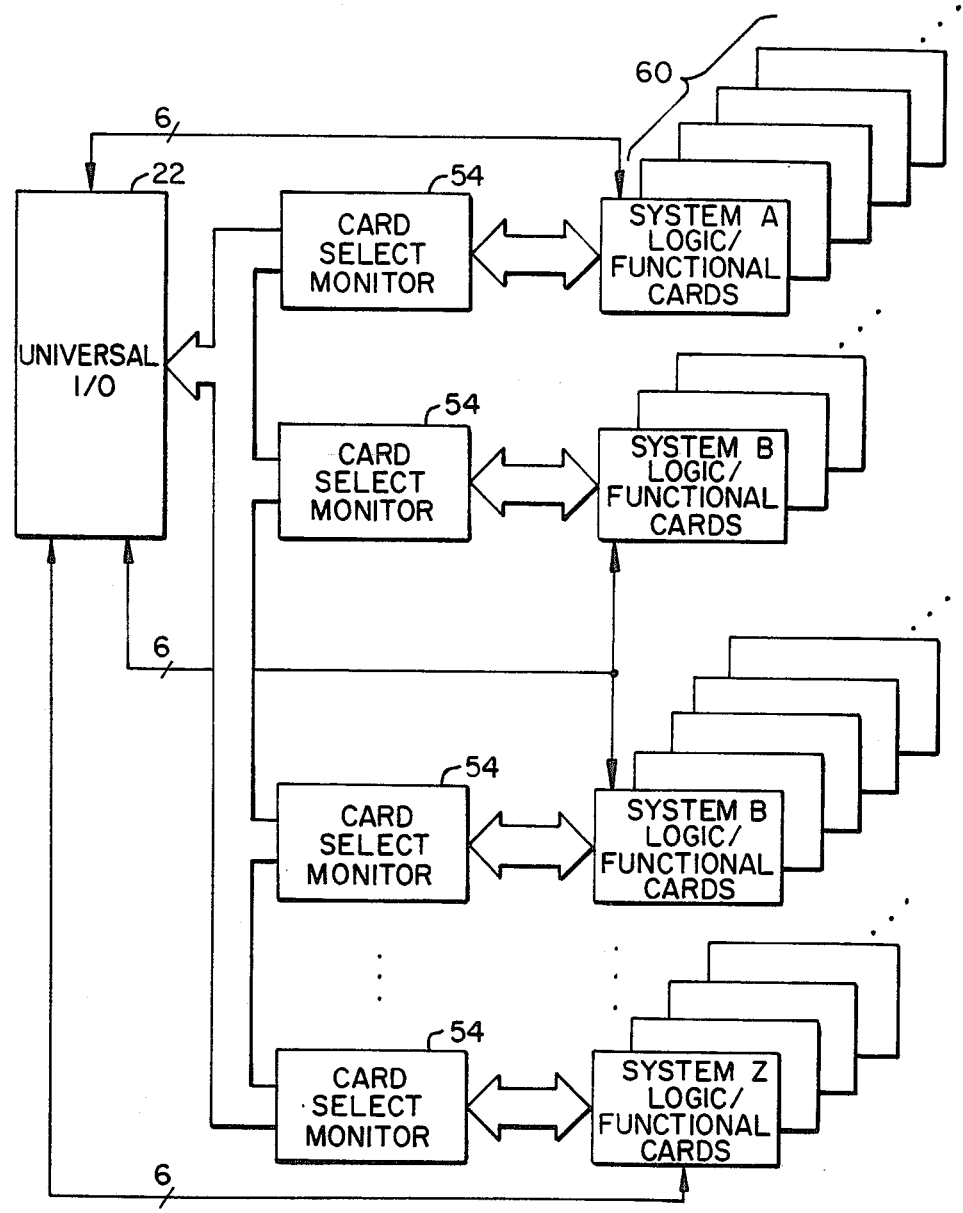
FIG._6.

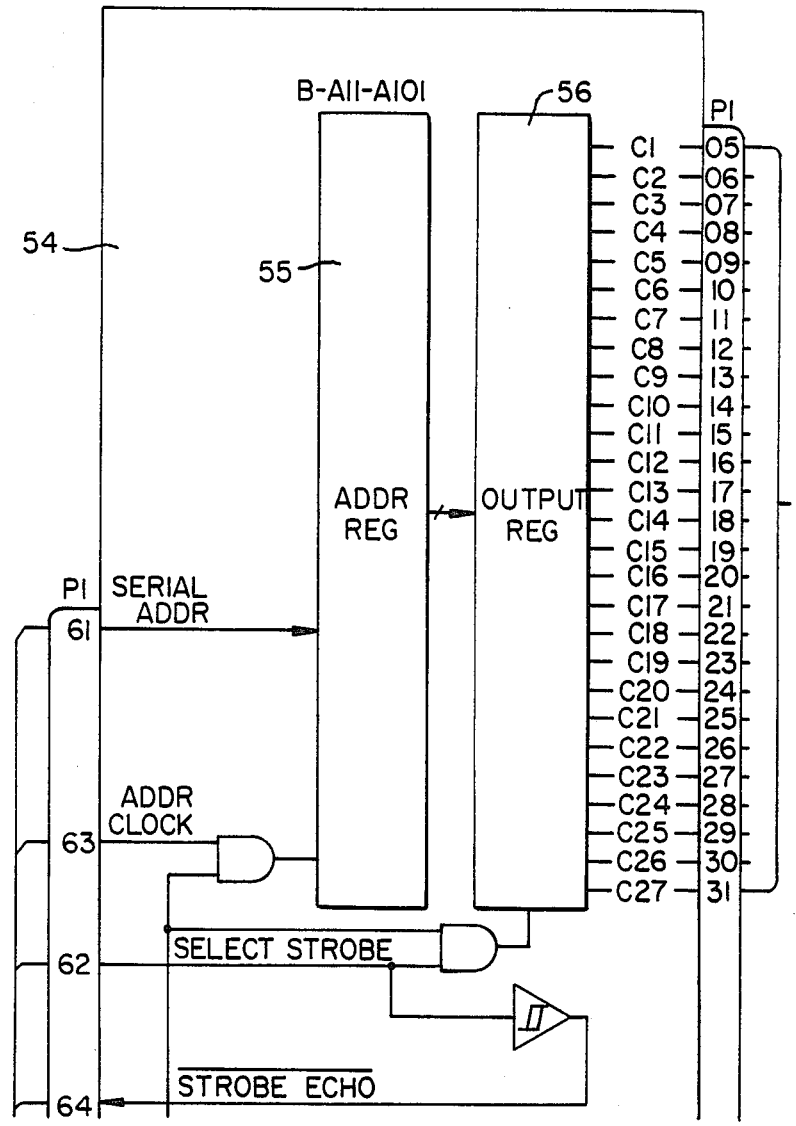
FIG._7A.

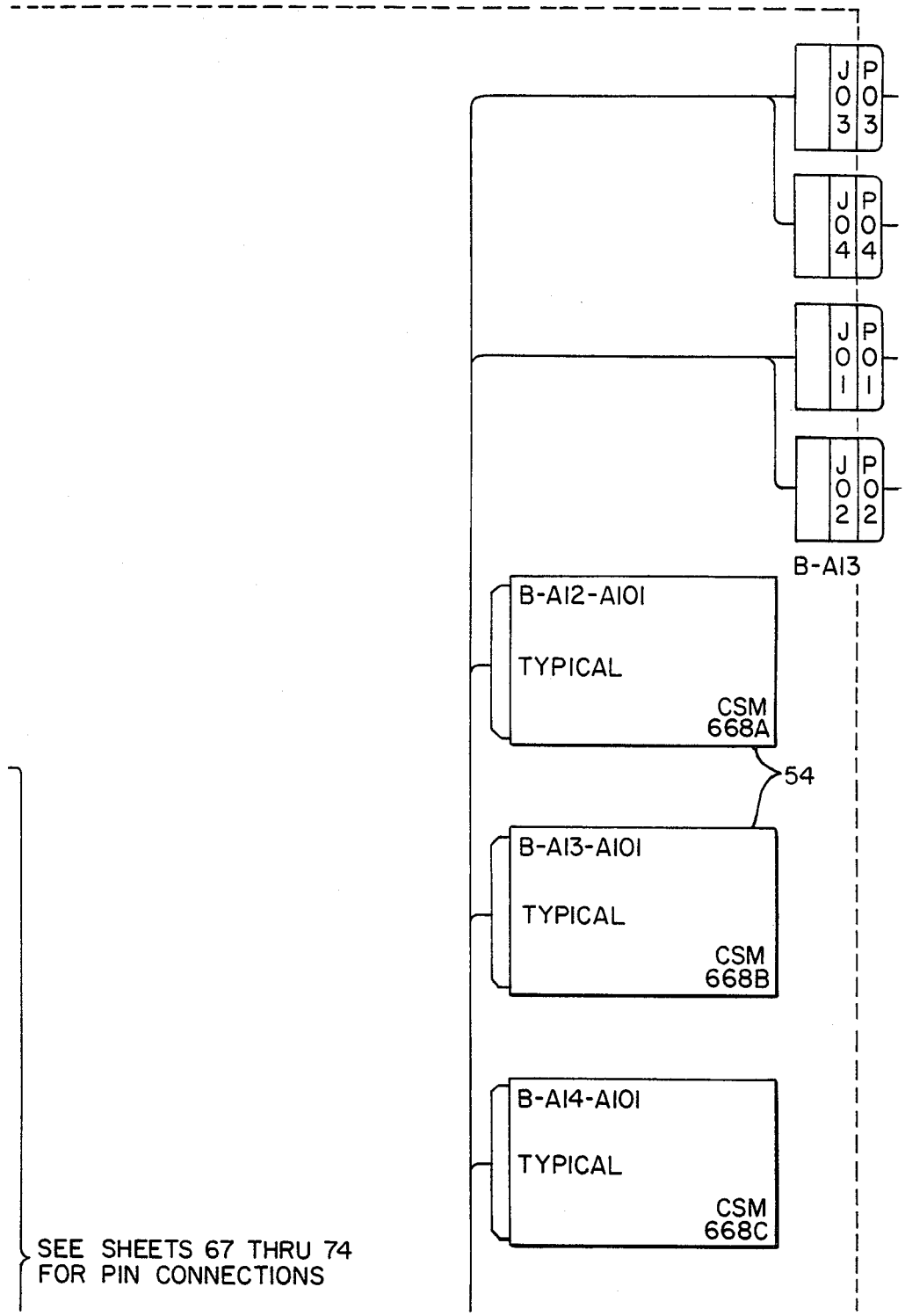
FIG._7B.

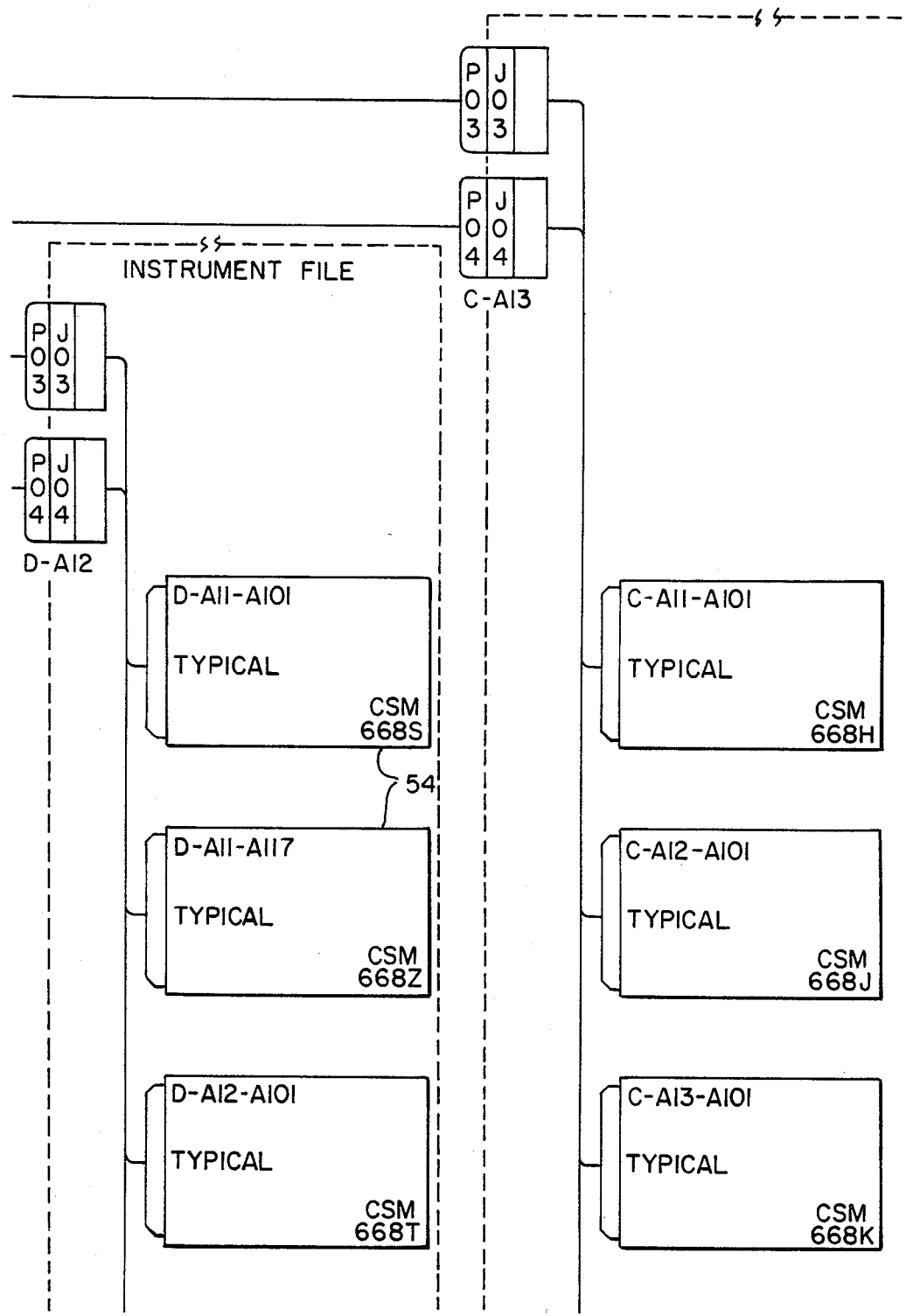
FIG._7C.

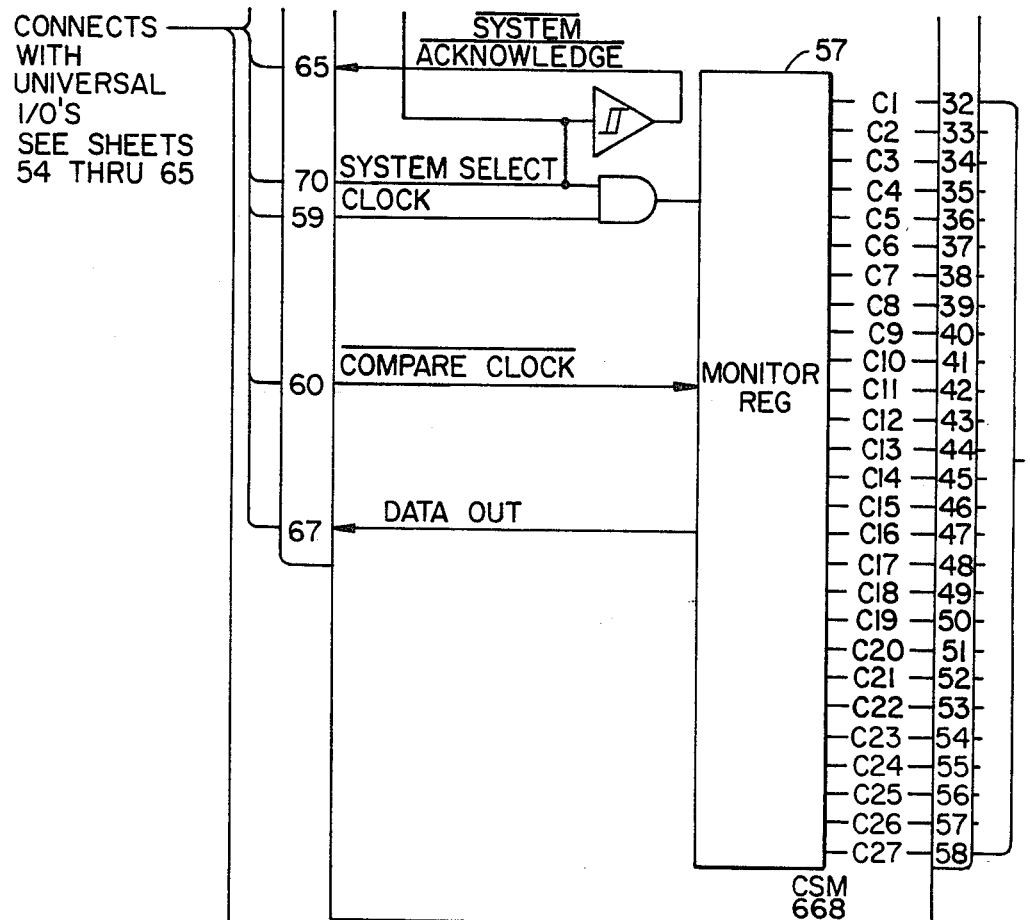
FIG._7D.
| FIG. 7A. | FIG. 7B. | FIG. 7C. |
| --- | --- | --- |
| FIG. 7D. | FIG. 7E. | FIG. 7F. |
FIG._7G.

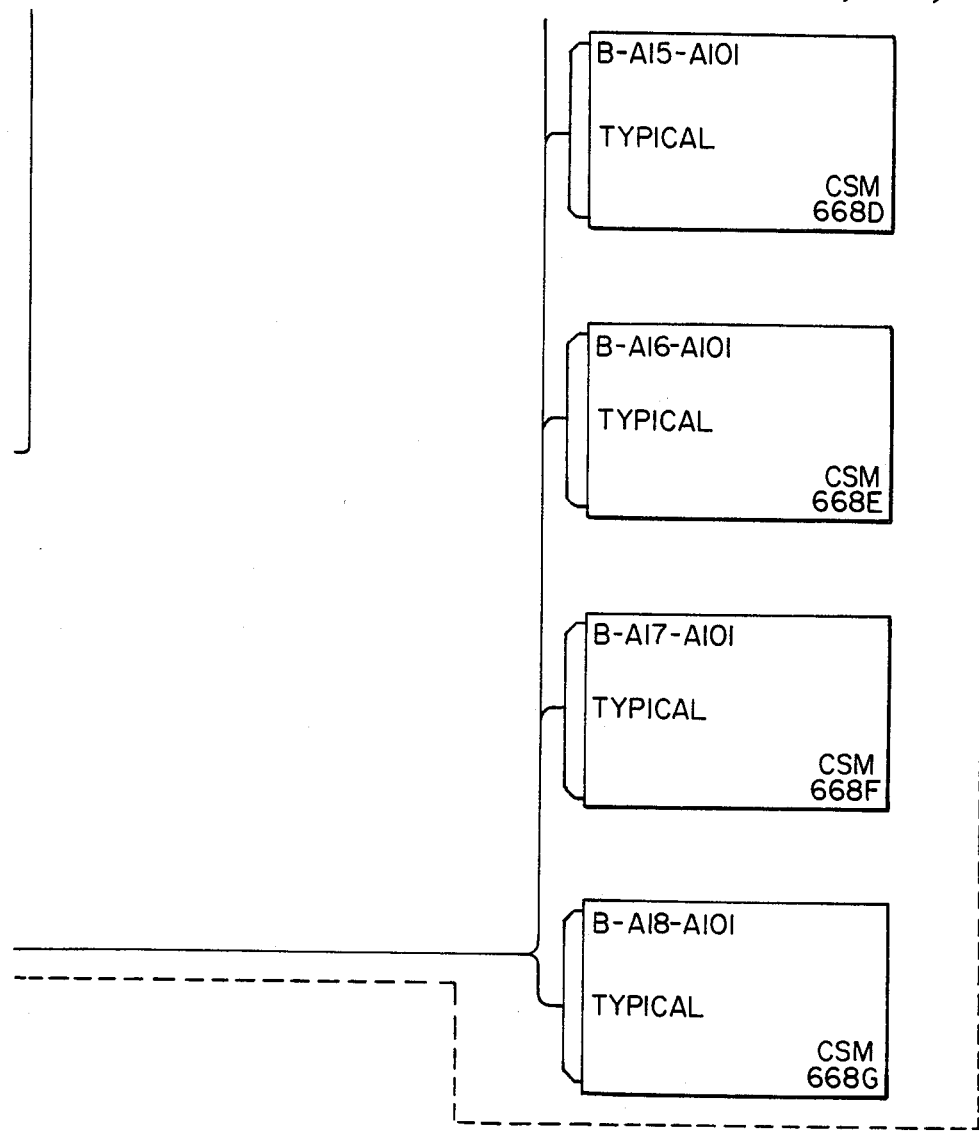
FIG._7E.

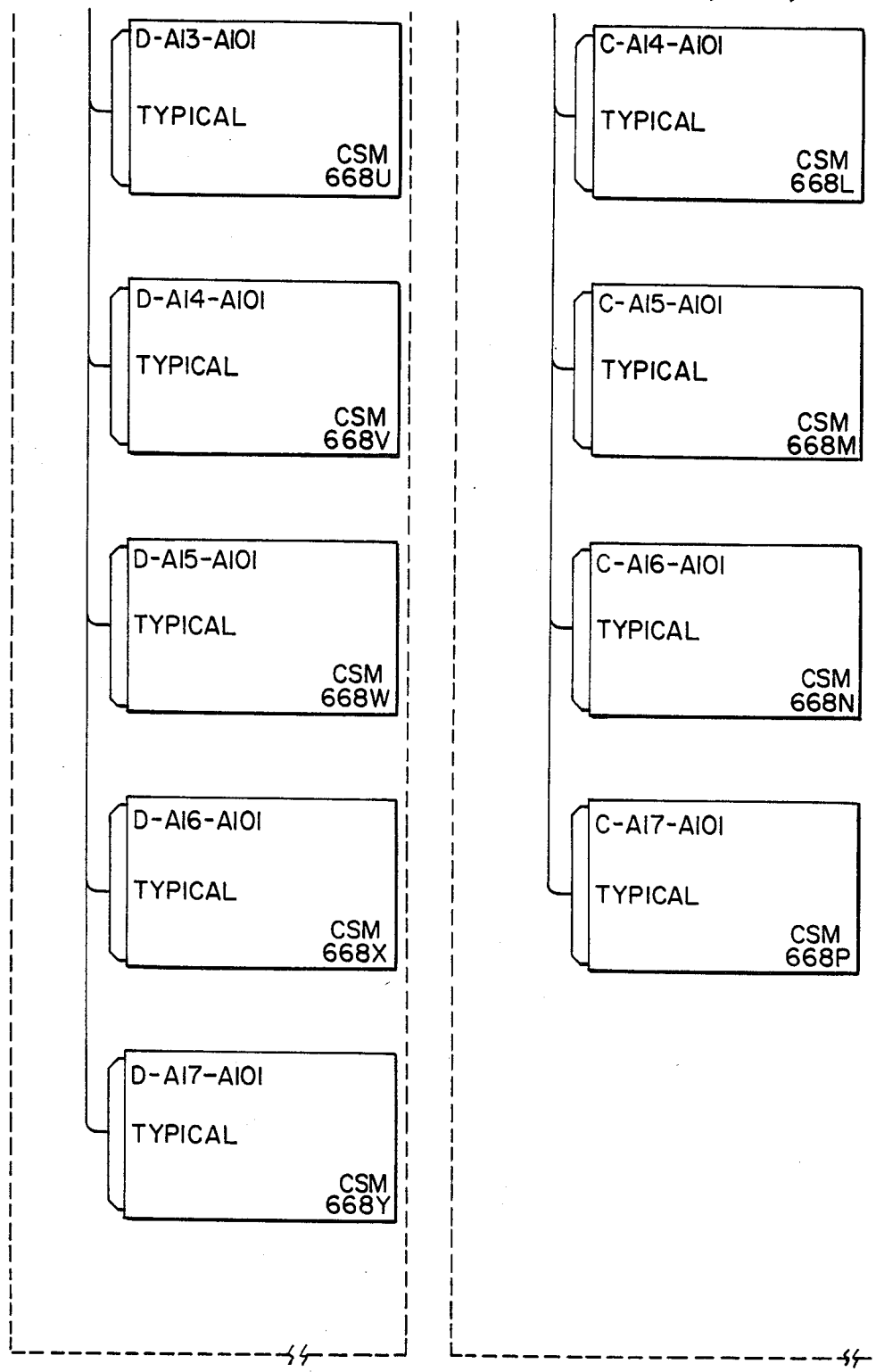
FIG._7F.

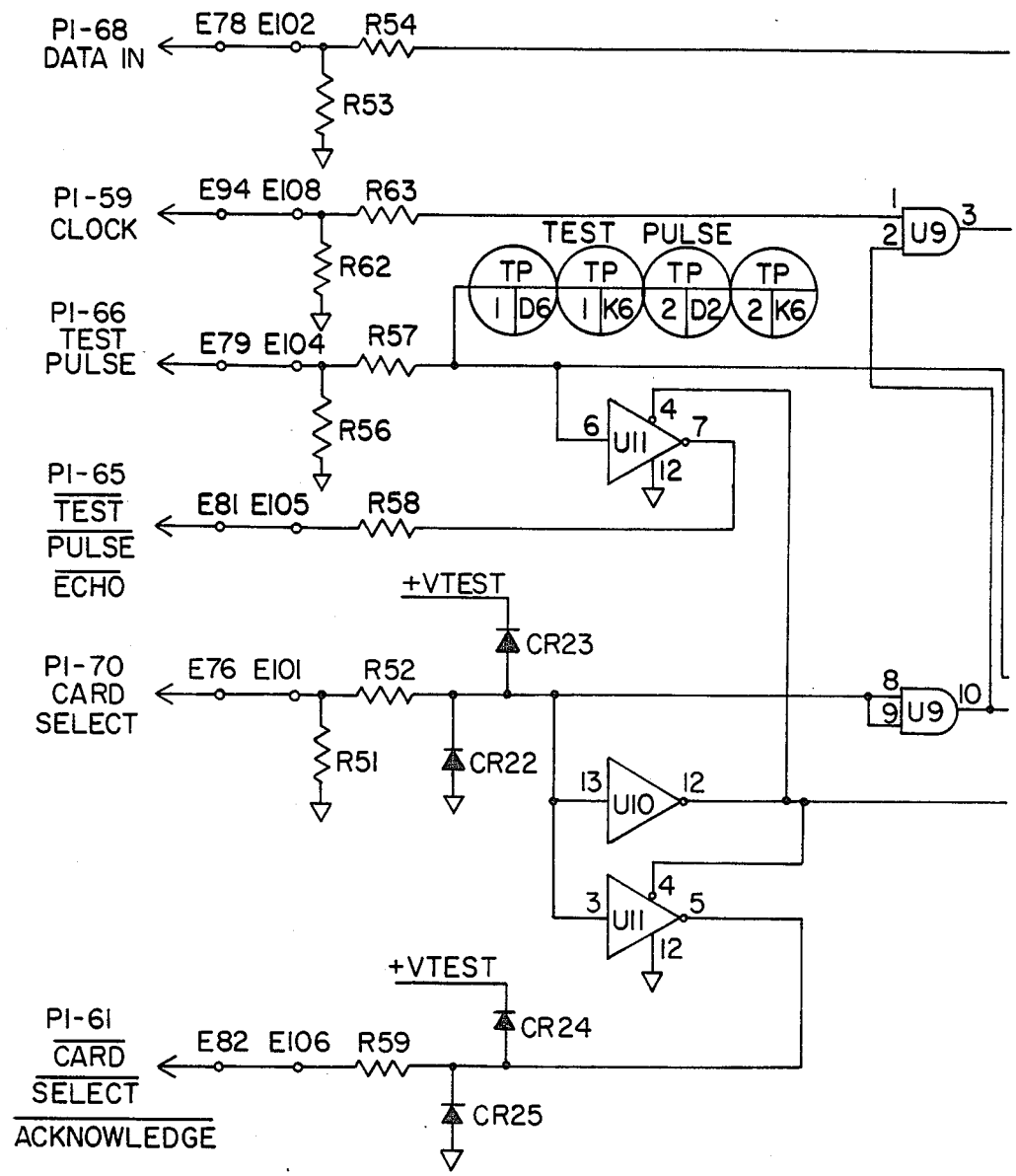
FIG._8A.

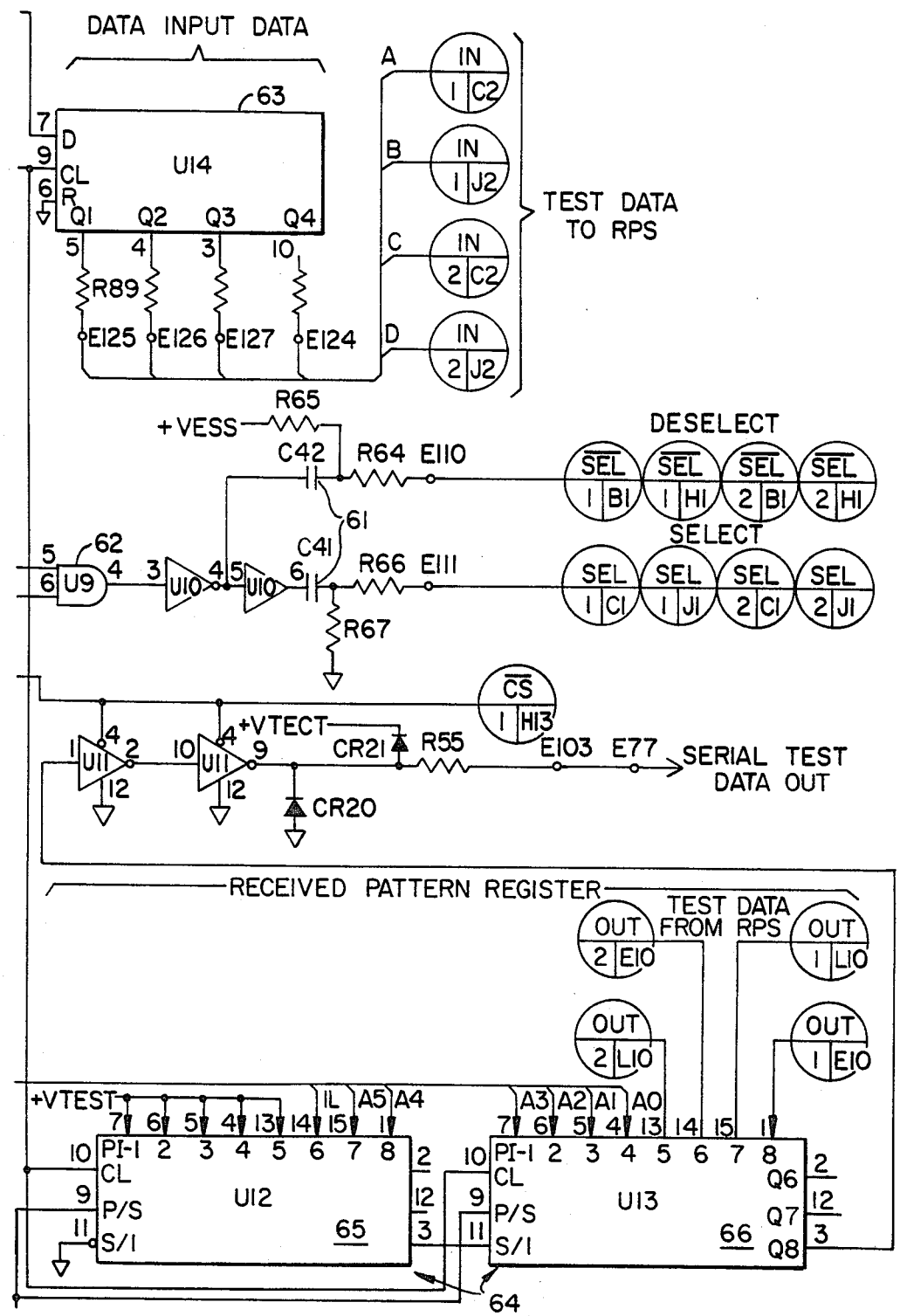
FIG._8B.

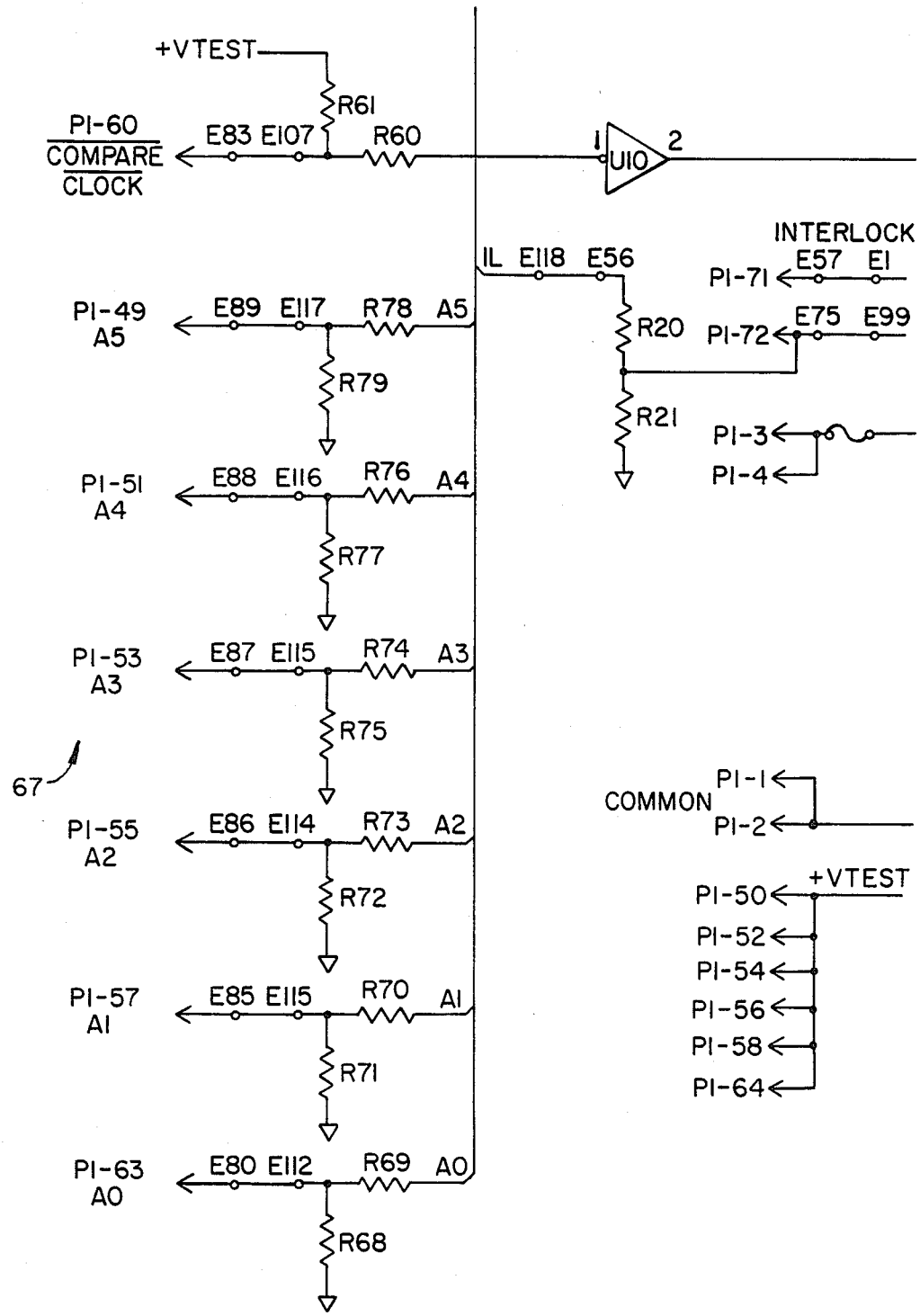
FIG._8C.

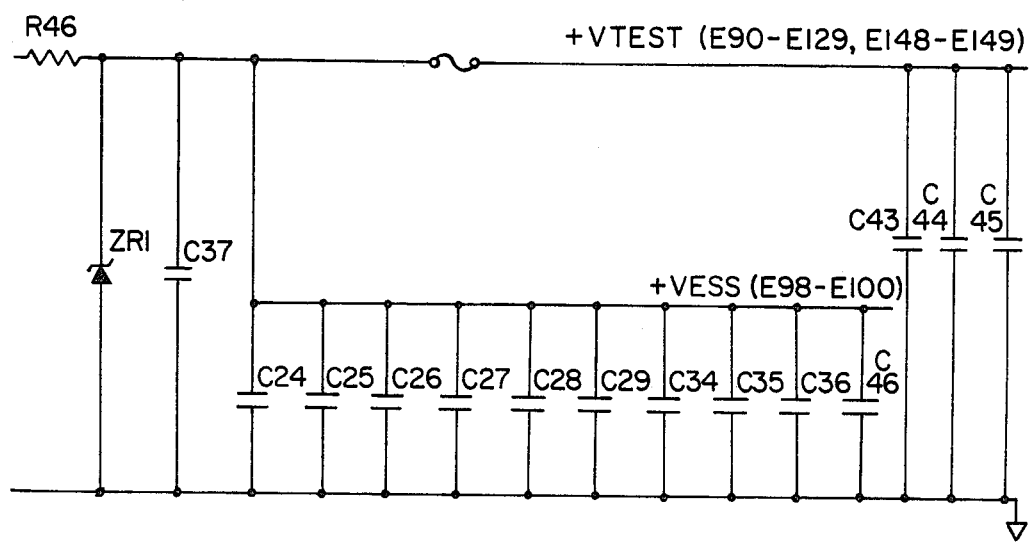
FIG._8D.
| FIG. 8A. | FIG. 8B. |
| FIG. 8C. | FIG. 8D. |
FIG._8E.

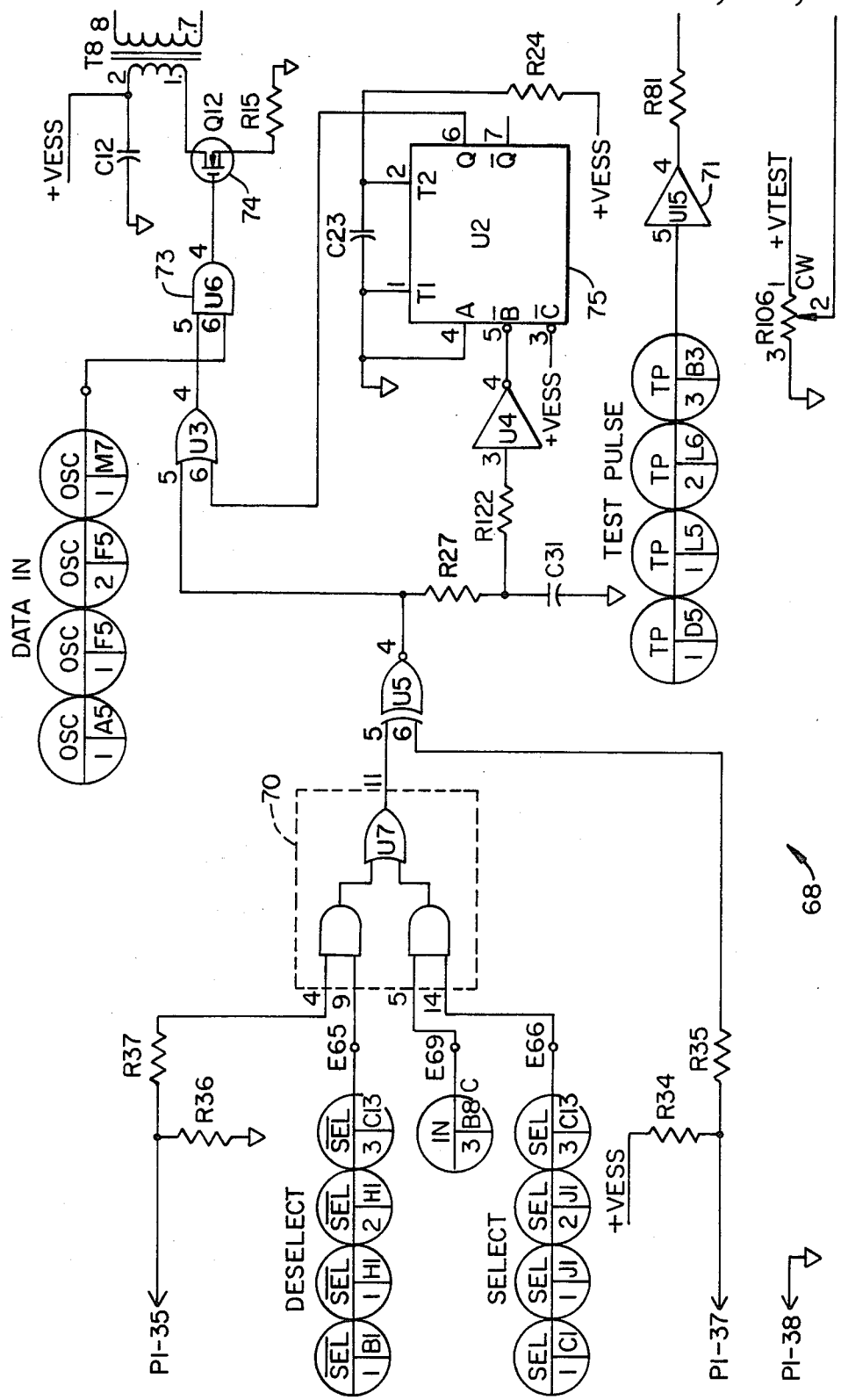
FIG._9A.

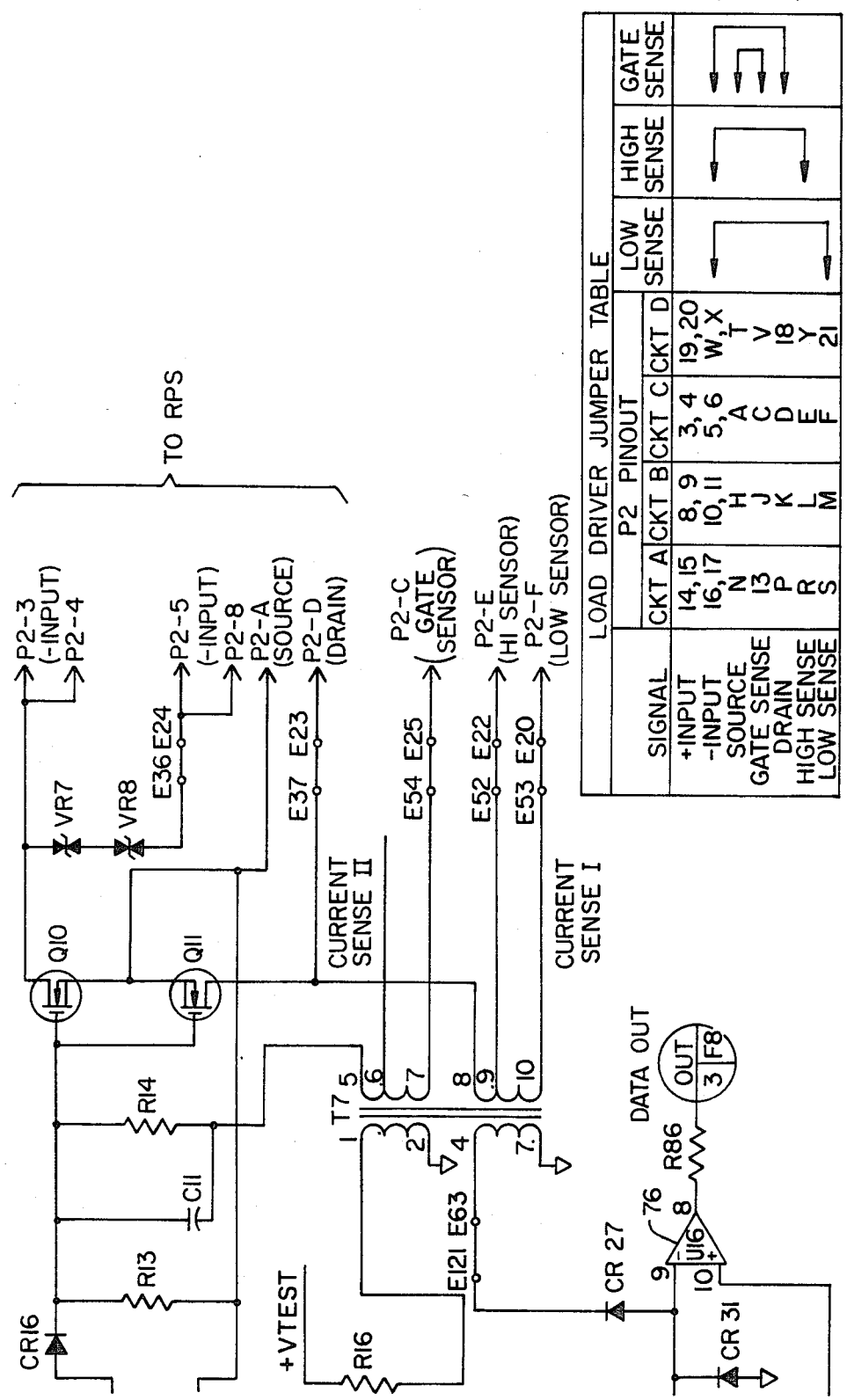
FIG._9B.

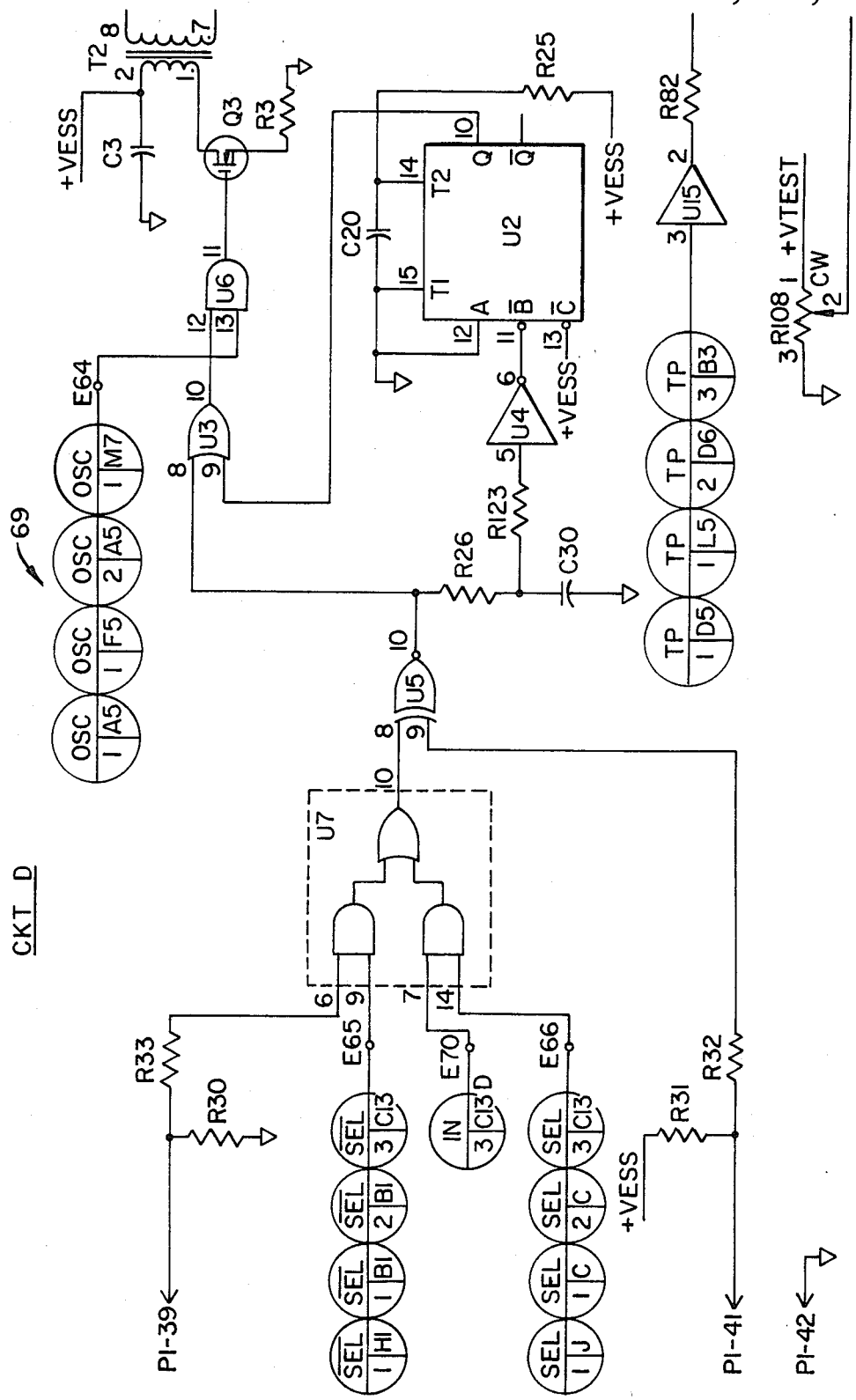
FIG._9C.

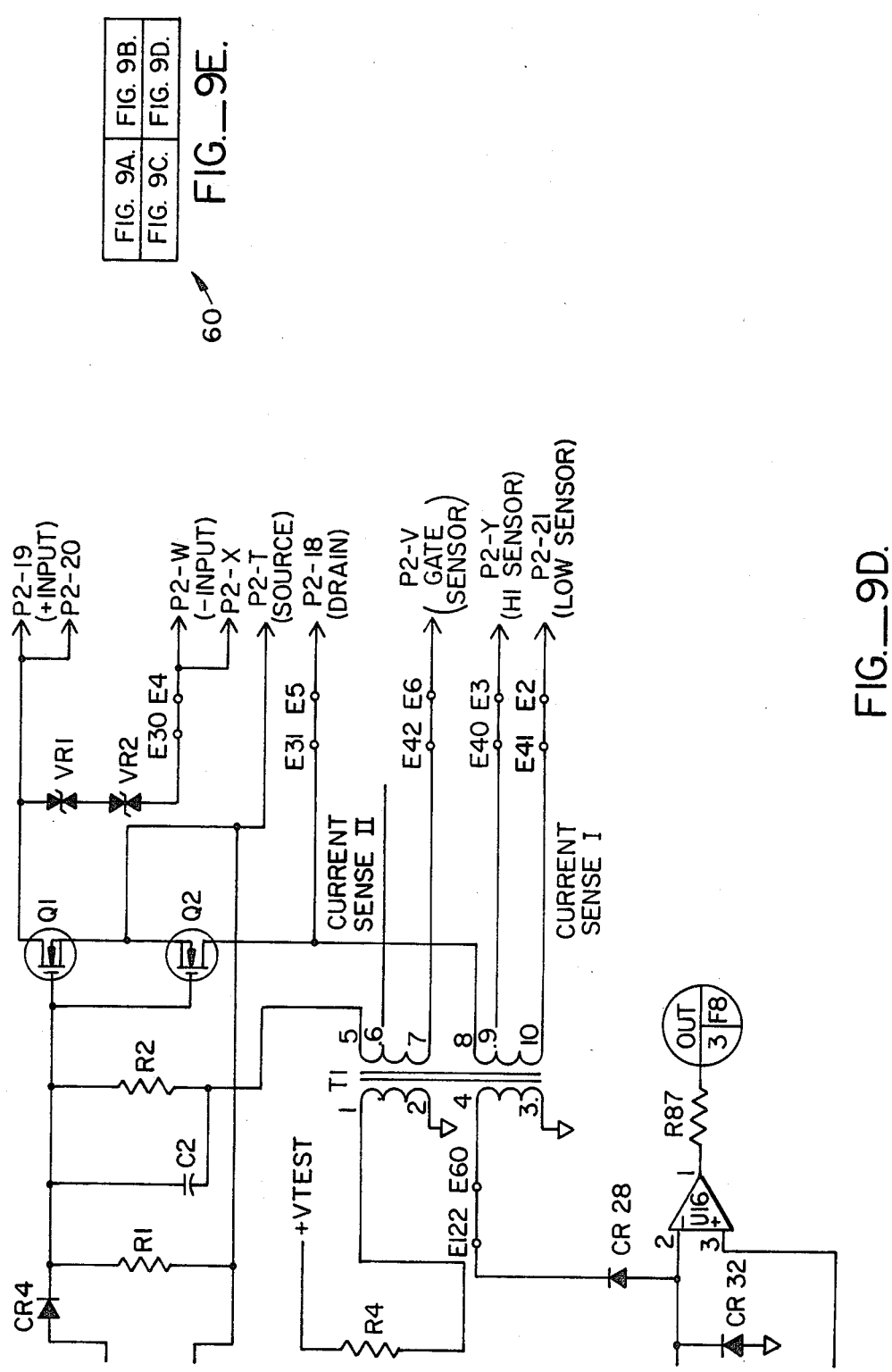

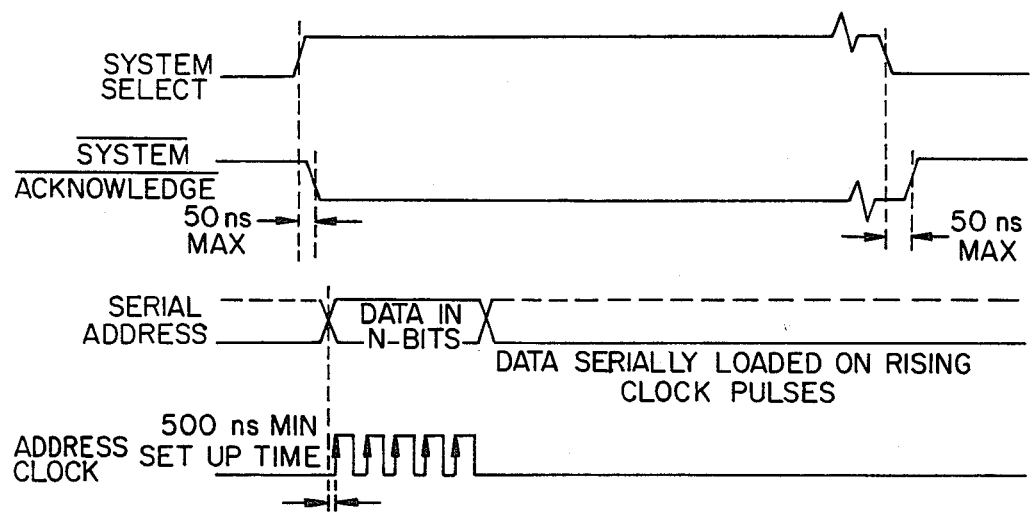
FIG._10A.
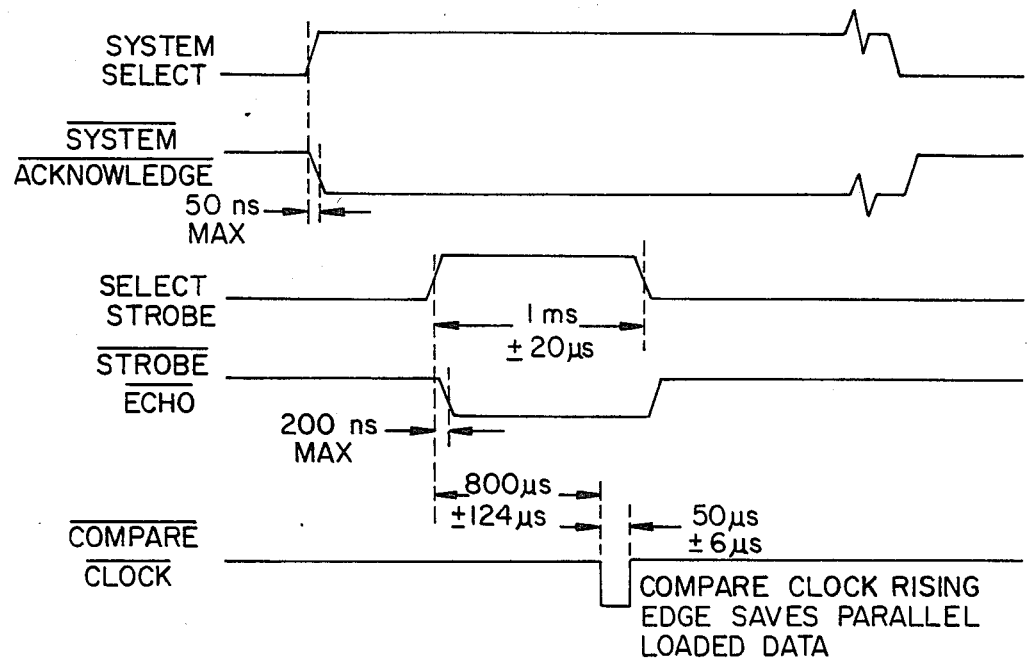
FIG._10B.

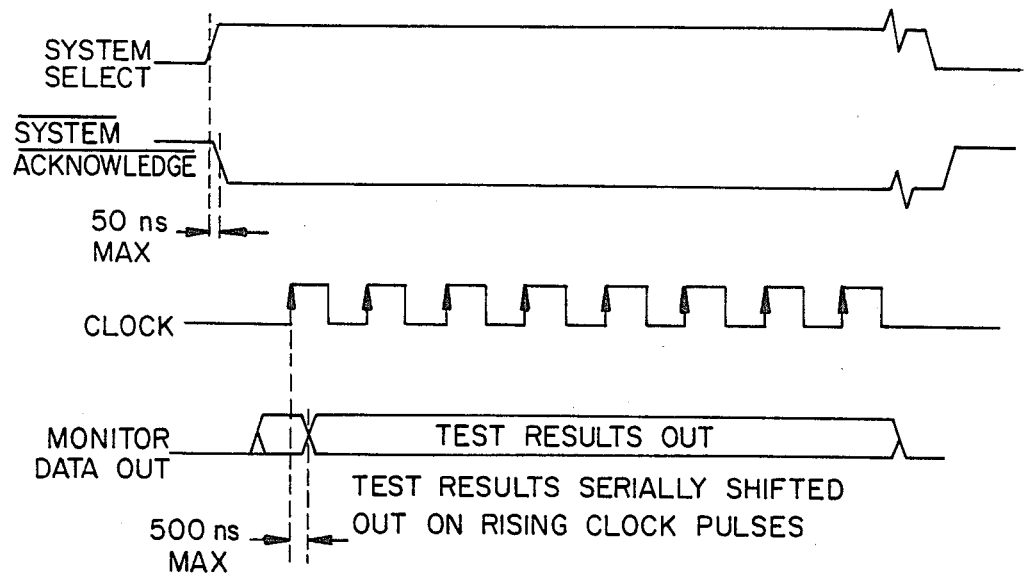
FIG._10C.
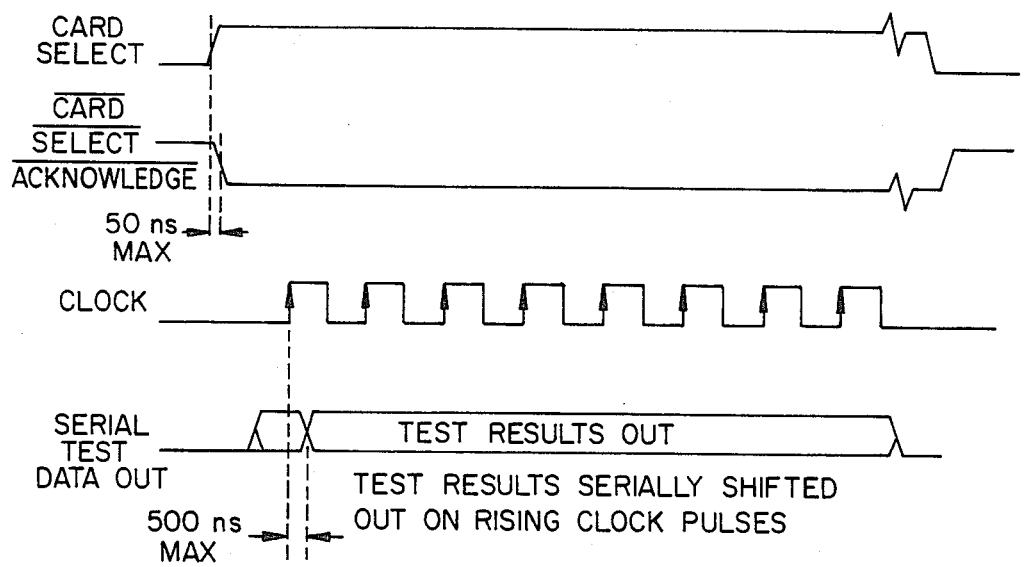
FIG._12.

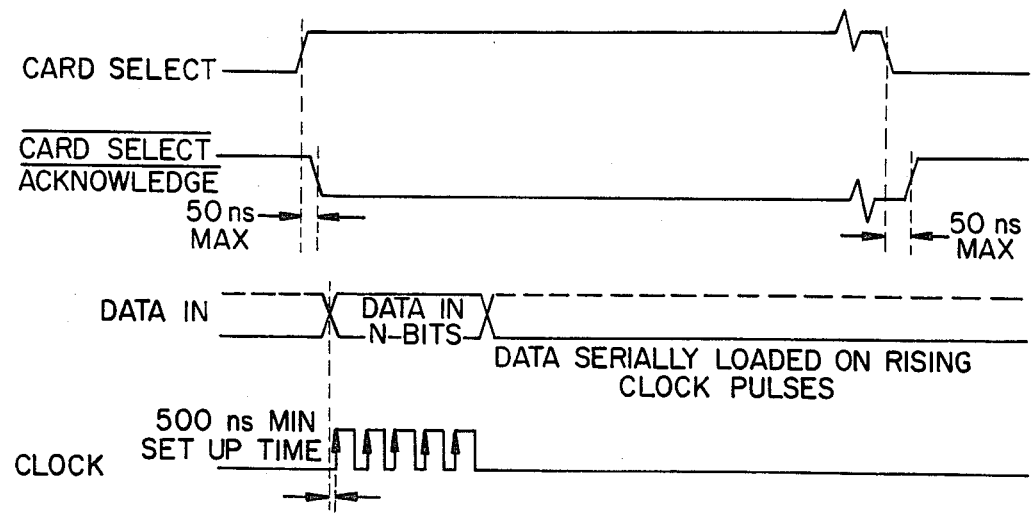
FIG._11A.
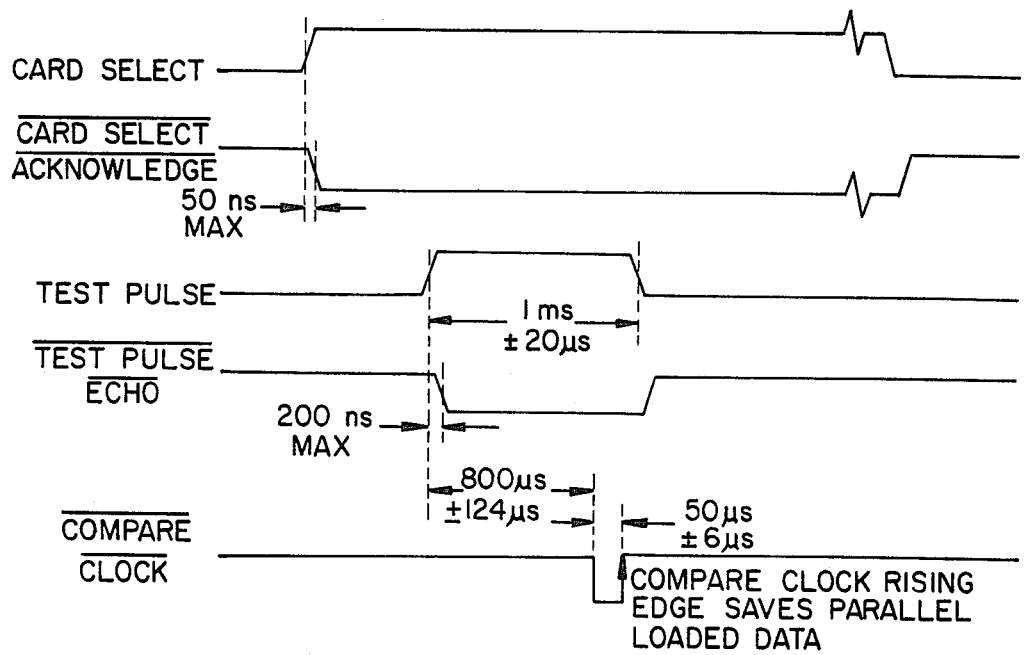
NOTE: ASSUMES DATA HAS PREVIOUSLY BEEN LOADED INTO THE INPUT DATA REGISTERS
FIG._11B.

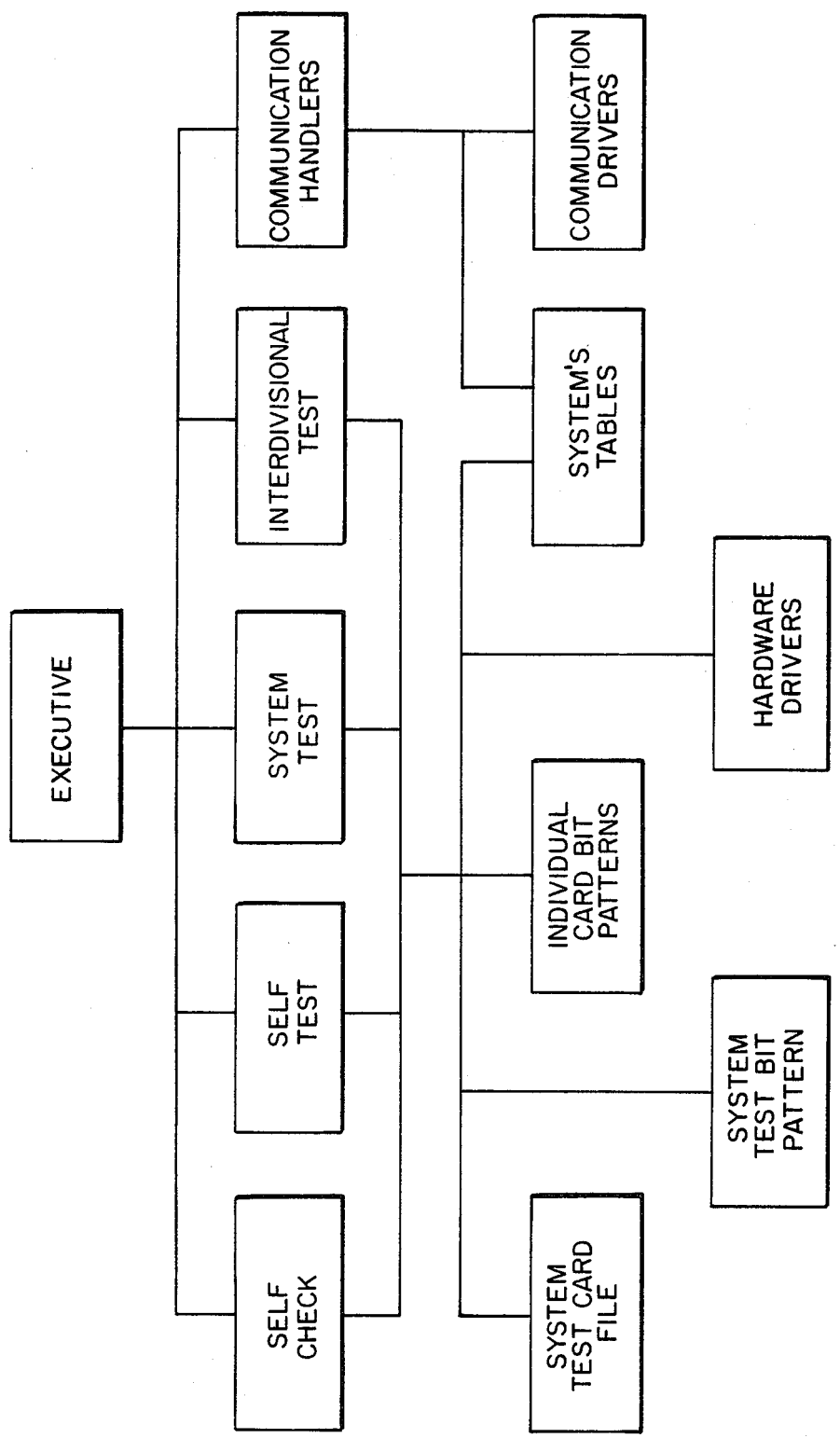
FIG._13.

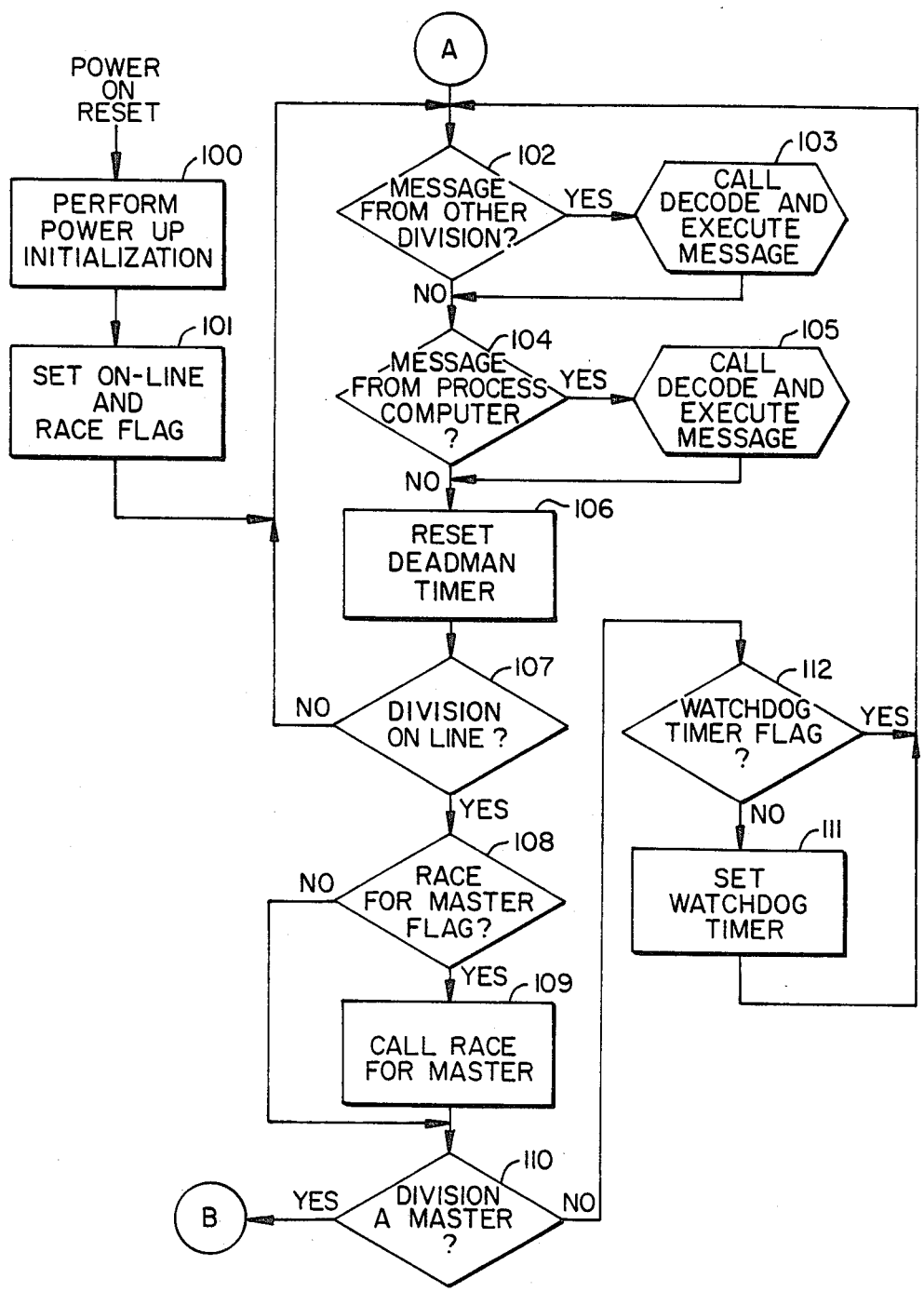
FIG._14A.

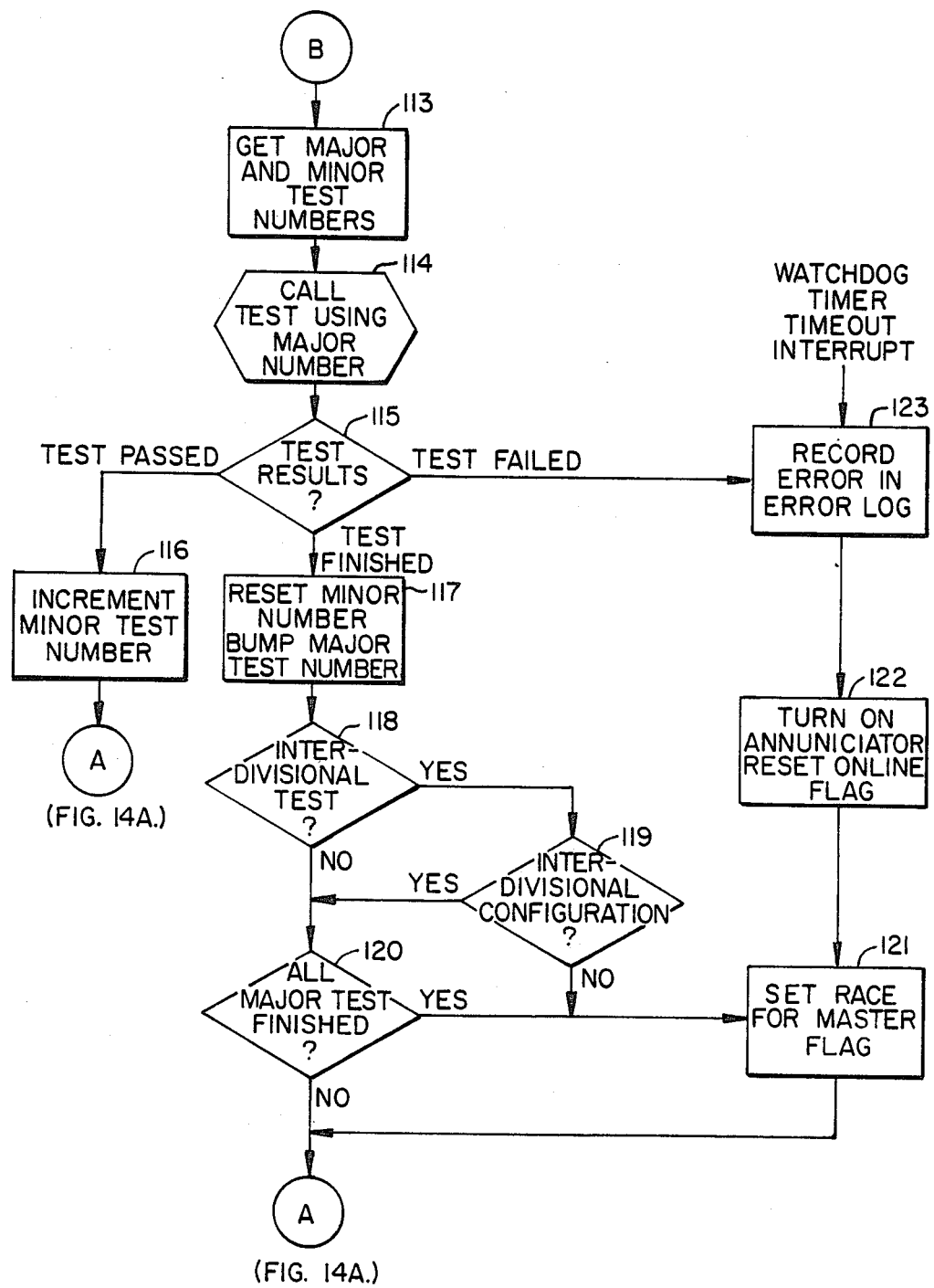
FIG._14B.

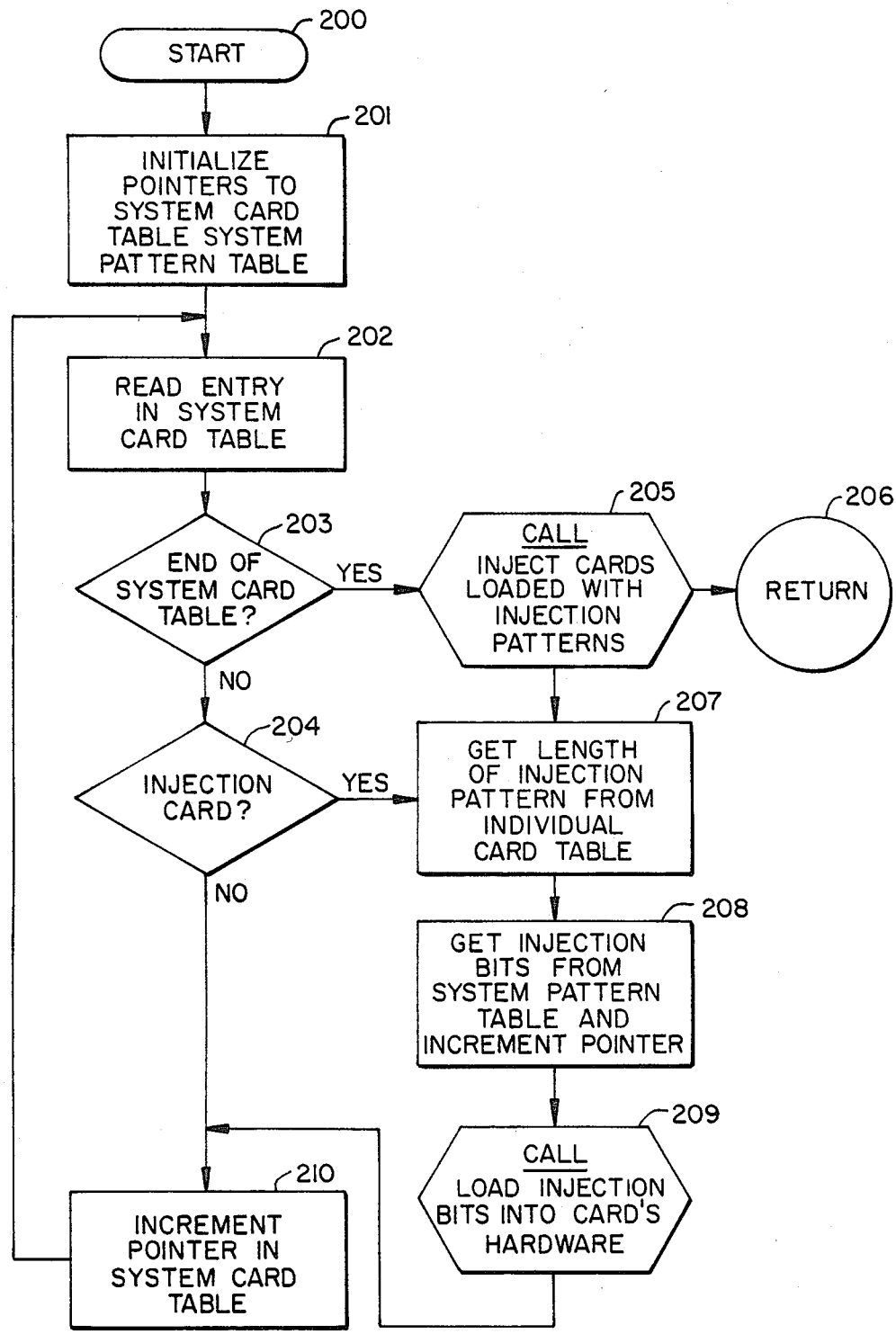
FIG._15.

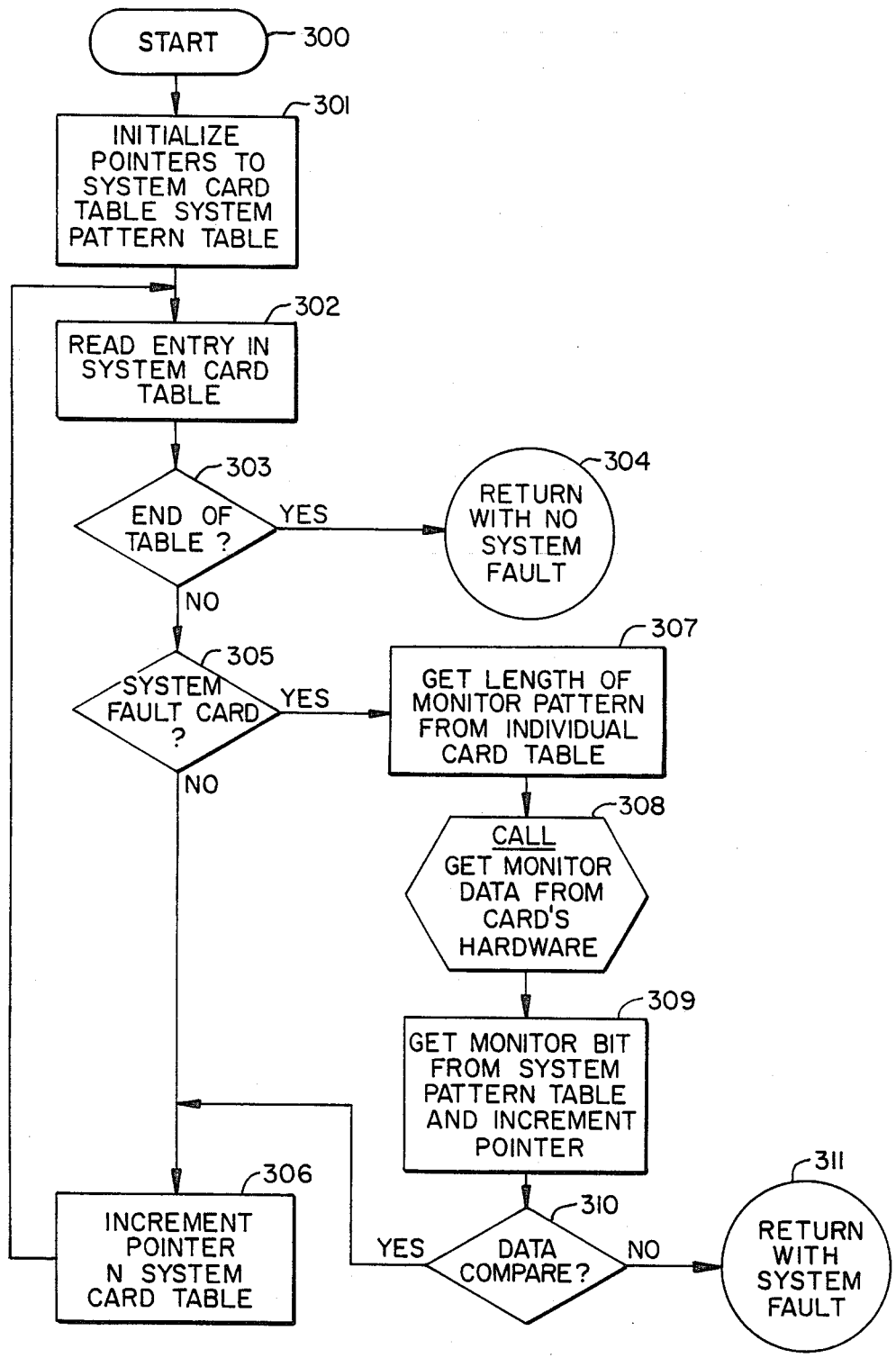
FIG._16.

SELF-TEST SUBSYSTEM FOR NUCLEAR REACTOR PROTECTION SYSTEM

FIELD OF THE INVENTION

The present invention relates to nuclear power plants and, more particularly, to a self-test subsystem for a nuclear reactor protection system. Specifically, between sensors such as core overheat sensors and a corresponding safety or operation function, such as the insertion of rods to shutdown a reactor, there is located an electronic nuclear reactor protection system. The readiness of this system to respond to emergency conditions is the subject of this disclosure. Specifically, provision is herein disclosed for constant self-test of such systems to assure that at all times a power plant is in readiness to respond to emergency.

BACKGROUND OF THE INVENTION

Modern nuclear safety requirements are high. In the prior art it is known to have nuclear reactor protection systems. An example of such a system is helpful to the reader. Specifically, if core overheat is detected, it is usually detected in sensors. The sensors in turn have to communicate through a nuclear reactor protection system to actuate core apparatus for correcting the condition. Assuming that overheat has been detected by a sensor, an appropriate response (used in this disclosure as a primary example) may be the insertion of rods to absorb neutrons and shutdown the reactor. This may be part of a system wide emergency shutdown known as a "scram".

In such a system there is always the danger of latent failures. Specifically, and as time lapses after a test has occurred, the probability increases that the system may be inoperative. The system must await the next actual test until proper operation can again be confirmed and a lower probability of failure established.

The seriousness of undetected failures becomes even more apparent when one considers the case of so called "common mode failures". "Common mode failures" are system wide. Because they are system wide, common mode failures affect the system throughout, even at points of system redundancy. Failures due to high voltage transients, fire, earthquake, and other mechanical causes may remain latent until the system is exercised. If system exercise is to occur in response to an emergency, no one may be aware that the system is incapable of responding to the emergency until the required emergency procedure is instituted. Then it is too late.

An operator may respond to an emergency in a number of different ways by moving the plant from the perilled operating state to one that is safer. All of these safer states require different operating configurations of the plant. In nuclear plants, the availability of different operating configurations has not heretofore been capable of test without actual plant manipulation.

SUMMARY OF THE PRIOR ART

Prior art testing of nuclear plants has included manual tests. In such manual tests, portions of the system are first isolated. Thereafter, these isolated portions are individually exercised. During such individual exercise, at least three conditions can occur, all of which are detrimental to the plant operating state.

First, an isolated portion of the plant may have to be rendered inoperative for the test to occur. Whenever any portions of the plant are rendered inoperative, emergency responses and/or plant operations must of necessity be adversely affected. For example, individual exercise of rods in the reactor core will of itself affect core reaction.

Secondly, while the exercise is occurring, system failure is still possible and may become even more catastrophic. Typically, the isolated portion of the system is not capable of responding to an emergency. For example, assuming that one of four banks of reactor rods is being tested and therefore rendered inoperative, failure of a second bank of reactor rods leaves shutdown capacity at a reduced level of design system capacity.

Finally, some shutdown components of the system require that the system go completely off-line. When the system goes completely off-line, at best, valuable power output is lost. System losses at rates of $200,000 per hour necessitated because of tests are common and known. Moreover, testing itself can cause an undetected failure. For example, rods are actuated and a solenoid breaks while returning the rods. The result of the test shows the solenoid to be working while in actuality it is now broken and the break will not be detected until the next test.

SUMMARY OF THE INVENTION

A self-test system for a nuclear power plant, nuclear reactor protection system is disclosed. Nuclear protection systems are the electronic controls, typically including circuit cards, located intermediate between sensors (as for detecting core overheat) and a control (as for providing rod injection to shut down a reactor). Constant surveillance of the nuclear system protection system is provided by a microprocessor that serially addresses protection system circuit cards and loads them at predetermined input points with test commands. The addressed cards are thereafter simultaneously activated by a system-wide command. The test command is a pulse which is so short in duration that its affect is transparent to the system and cannot cause overall system operation. The pulse passes through the actuating electrical components to verify, on the real actuating path, the operating integrity of the system. After an appropriate response interval, the output state of the system is recorded in system-wide resident registers. Thereafter, with response data contained in these registers frozen at the recorded state, the output is read. This result is compared with the expected output in computer memory. If correspondence between memory output and register output is found, the next sequential set of test commands is acted upon. If correspondence is not found, a subroutine search is automatically conducted to locate the error. The disclosed self-test subsystem is duplicated in four separate divisions with each division testing one of the four duplicate protection systems. The three remaining and idle divisions constantly monitor the active subsystem's operation. The end result is an overall system which reduces the mean time to discover error, thus minimizing mean time to repair and maximizing protection system availability and safety. The separation of the protection system into four duplicate divisions is not dependent on the disclosed invention and the invention may be applied to protective systems with a different number of divisions.

OTHER OBJECTS, FEATURES AND ADVANTAGES

An objective of this invention is to disclose a process for testing the electronic controls of a nuclear reactor protection system. According to this aspect of the invention, test input registers throughout the nuclear reactor protection system are serially loaded on command from a computer. These test input registers, once wholly loaded, are simultaneously activated by a system-wide command. Test pulses are released, which test pulses have such short duration in real time that they are not seen by or are "transparent" to the nuclear plant operating system. The test pulses pass through the real actuating electronic components of the nuclear system thus causing the components to be in fact tested for their actual electronic integrity. Thereafter and when an appropriate period of time has passed, the response data contained in the registers are frozen so as to record the protection system's state. Once the data is frozen, the system wide registers are serially read and their output compared with predetermined, correct responses stored in memory. Where matching occurs, system integrity is verified.

An advantage to this apparatus is that no part of the power plant need be isolated for testing of nuclear system integrity to occur. Therefore, even though the disclosed process is continually verifying the operational integrity of the plant, in no way is the plant's ability to respond to an emergency adversely affected. For example, in testing the controls to exercise rods in a reactor, no actual exercise of the rods is required.

A further advantage of the disclosed process is that since system exercise is not required for testing, the system is at all times capable of responding to an emergency. The necessity of rendering inoperative banks of rods, for example, is not required for a test of the nuclear reactor protection system.

Yet a further advantage of this apparatus is to reduce substantially the necessity of taking the system off-line. Accordingly, expensive test periods wherein system downtime is required are avoided.

Yet another object of this invention is to disclose an apparatus for practicing the disclosed process. Specifically, at least one computer (here having a central processing unit and associated memories) sequentially tests various discrete systems. In the test of each group of protection system circuits, input registers at preselected locations throughout the protection system's electronic cabinets are serially addressed and thereafter loaded with test commands. When the input registers are loaded, test impulses of a duration short enough to be transparent to overall operation are simultaneously released by a system-wide pulse. This simultaneous release causes the effectively transparent pulses to travel through the real actuating path of the system. After an appropriate interval, and upon receipt of signal, the system response state is frozen in resident registers. These registers are thereafter read and their output compared to data stored in memory output to verify integrity of the real operating path of the system.

An advantage of this aspect of the invention is that the test process of this invention may be continually and repeatedly practiced by a computer. The computer in practicing the test process continually and remotely verifies the operational integrity of a nuclear reactor protection system.

Yet another advantage of this aspect of the invention is that the system is capable of detecting whether any discrete emergency function, in whole or in part, is sufficiently functional to move the plant to another operating state. For example, during either normal operation or crisis, an operator can ascertain relatively quickly before rearrangement of the operating state of the plant, whether the next and intended operating state of the plant is available.

Yet another object of this invention is to disclose partitioning of the protection system's circuits into subgroupings in the event that an error is located. According to this aspect of the invention and where the memory output does not compare with the desired register output, partitioning of the test can occur. In such partitioning, either additional system output registers may be read or, alternatively, new system subtests may be initiated. Further, appropriate branching can be accomplished so that testing is directed with increasing particularity towards points of system failure.

Yet another object of this invention is to disclose the components of the test system and in particular to disclose replacable circuit cards. According to this aspect of the invention, the cards include electronic apparatus for recognizing serial addresses and registers for input or output of either test commands or system status. These discrete cards are replacable and inventoried so that when a point of failure is located with particularity, a technician may be dispatched for card removal and replacement to restore system integrity.

A further advantage of this apparatus is continuous testing wherein the mean time to discover failure is dramatically reduced. The sooner the failure is discovered and located, the sooner it can be repaired and the system be made available. Using the formula:

$$(MTBF/MTBF + MTBR = A,$$

where:

A = Availability,
MTBF = Mean Time between Failures, and
MTBR = Mean Time between Repairs, it is easily seen that as MTBR is reduced, availability approaches the desired 100%. An advantage of testing without affecting functional operation is that the particular system being tested remains fully operative, thus retaining full safety protection for the plant. Furthermore, when simple hardware design precautions are observed, failures in the self-test system itself cannot affect any essential circuitry of the nuclear reactor protection system.

Another advantage of automatic, computerized testing over manual testing is speed. The self-test system performs a complete agenda of tests within 30 minutes as compared to many days of manual test. It also allows for testing by request as well as automatic surveillance.

A further advantage of the self-test system is the ability to test using simulated plant state input to the nuclear system protection system. By not requiring the plant to be in any particular actual state to conduct the test, time is saved and availability thereby enhanced. This is especially true for seldom-used states such as core overheating which would require a scram.

Yet another advantage of this invention is that there are four independent self-test controllers, one for each of the redundant nuclear system protection systems. There are no electrical connections between the four self-test controllers, the only intercommunication being through optically coupled isolators.

The advantage of this isolation is that if, for example, one of the self-test controllers were shorted out it would not affect the operation of the others.

Furthermore, there are minor variations in the design of the four self-test controllers (for example, wiring) in order to avoid any possible common-mode systematic design error.

BRIEF DESCRIPTION OF THE FIGURES

The present invention is best understood by referring to the specification and the following figures, in which:

FIG. 1 is a block diagram of an automatic self-test nuclear reactor protection system according to the present invention;

FIGS. 2A-2H are a side-by-side schematic of the self-test system, which includes a typical universal I/O card, a serial I/O card, and related circuitry with FIG. 2H showing the interrelationship between FIGS. 2A-2G;

FIG. 3 is a block diagram of the self-test system showing the CPU card, the universal I/O card, and the serial I/O cards interconnected on the data, address, and control busses;

FIGS. 4A-4H are a side-by-side wiring schematic diagram showing the outputs and inputs of the universal I/O card and also showing the card selects for accessing the discrete cards in individual files with a card identification for checking the parity of the card slot with the information on the card slot and showing representative system cable connections with FIG. 4H showing the interrelationship between FIGS. 4A-4G;

FIGS. 5A-5G are in additional interwiring diagram for the self-test system showing functional card level signals in more detail with FIG. 5G showing the interrelationship between FIGS. 5A-5F;

FIG. 6 is a block diagram of the self-test system from the universal I/O outward toward, as an example, the RPS system circuitry. FIG. 6 includes the card select monitors, the system test functional cards, and the associated busses;

FIGS. 7A-7G are a schematic diagram of the card select monitor showing one card select monitor in detail and additional card select monitors in block form only with FIG. 7G showing the interrelationship between FIGS. 7A-7F;

FIGS. 8A-8E are a schematic diagram of the self-test portion of a protection function card showing input and output signals and various circuit components with FIG. 8E showing the interrelationship between FIGS. 8A-8D;

FIGS. 9A-9E are a schematic diagram of a two self-test portions of the protection function cards illustrating a portion of the protection function card that is considered essential circuitry (the portion which actually performs a reactor protection) and FIG. 9E explains the relationship between FIGS. 9A-9D;

FIG. 10a is a timing diagram showing a card select monitor address register being loaded;

FIG. 10b is a timing diagram showing card selection and monitoring;

FIG. 10c is a timing diagram showing monitor data retrieval;

FIG. 11a is a timing diagram showing the loading of an injection pattern into the input data registers of a protection function card;

FIG. 11b is a timing diagram showing the injection of a test pattern through the protection function card logic;

FIG. 12 is a timing diagram showing serial test results being shifted out of a safety function card after a system test;

FIG. 13 is a block diagram showing the organization of the self-test system computer program;

FIGS. 14A and 14B are a flowchart showing the self-test system computer executive program with the logical interconnection points on FIG. 14B referring to FIG. 14A;

FIG. 15 is a flow chart of a system test showing the system card injection routine; and FIG. 16 is a flow chart of a system test showing system fault checking.

DETAILED DESCRIPTION OF A PREFERRED EMBODIMENT

The present invention, a self-test subsystem for nuclear system protection systems, rapidly detects hardware failures and thereby facilitates repair of a nuclear reactor protection system (RPS). The self-test system (STS) includes a memory in which sets of input stimuli test patterns and expected output results are stored. After running a test, the actual outputs obtained are compared with the expected outputs and should discrepancies exert such fact is annunciated to plant operators.

A unique aspect of the present invention is the fact that RPS tests may be run in real time while the system is in actual operation, without interfering with system operation. This is accomplished by using test pulses of short duration. Such pulses do not cause actual activation of the RPS components other than to check their continuity. Thus, the pulses are transparent to system operations.

The self-test system includes four optically coupled, intercommunicating self-test system divisions (FIG. 1), each division capable of operating as a master for the other three divisions and capable of operating as a slave to one of the other three divisions. Each division includes a self-test system (FIG. 2).

The self-test system includes a CPU/memory card 12 that contains a Z80 central processing unit 14, a read only memory (ROM) 15 that contains the self-test system operating program, and a random access memory 16. The CPU/memory card also includes an address decoder 17 and a processor clock 18. The processor includes a control bus, data bus, and address bus. The buses are routed through control bus, data bus, and address bus buffer circuits 19-21. The buffers serve as a bus interface between the CPU/memory card and the rest of the STS.

The CPU/memory card is interfaced to six universal input/output (I/O) cards 22-27 and one serial input/output (I/O) card 28. FIG. 2 shows universal I/O card 22 in detail and another five universal I/O cards 23-27 in block form. FIG. 3 is an overview of the STS hardware rack architecture. FIGS. 4 and 5 show specific wiring interconnects between the self-test system rack and the rest of the self-test system. FIG. 6 is an overview of the STS system architecture.

Serial I/O card 28 is buffered to the control, data, and address buses by control bus, data bus, and address bus buffers 30-32. The serial I/O card includes 32K of ROM 34 containing the data base for this particular one of the four divisions. ROM 34 is associated with an address decoder 35. Serial I/O card 28 also contains a data flow control network 36 and includes two parallel-to-serial I/O chips 37 that provide two output channels each. The chip output channels are interfaced to the self-test system motherboard I/O via a differential driver and receiver 38. Parallel-to-serial I/O 37 is driven by an on-board clock 39.

The serial I/O board provides four I/O channels. Three of the serial I/O board channels are connected, via optical isolators 42, to the other three divisions of the four division system. A fourth channel is a diagnostic function channel. The four divisions communicate with each other through each division's serial I/O board. The four divisions are optically coupled such that electrical failure of one division does not interfere with the operation of the other divisions.

The serial I/O board's fourth I/O channel provides diagnostic and functional information to system process computers 44 (FIG. 1). In this way, a particular error code may be routed to the process computer and then to an operator diagnostic terminal 45 wherein the error code is translated to English or other operator understandable messages to alert maintenance personnel.

During operation, when an annunciator 43 is activated, the operator can go to the process computer to locate the error by transferring commands through the serial I/O board to the self-test system to retrieve the failure information or to run the self-test system through particular tests, which tests then provide data back to the process computer indicating test results. In this way, a failure may be localized and more readily corrected.

The six universal I/O cards are interfaces between the self-test system rack and the self-test circuitry located on protection function cards (FIGS. 8 and 9). Each universal I/O card 22–27 has an interface to the control, data, and address busses consisting of control bus buffer 46, data bus buffer 47, and address bus buffer 48. Addresses are decoded by universal I/O card decoder 50 to operate either a 24-line input port 52, in which case the universal I/O is an input device; or to operate a 24-line output port 53, in which case the universal I/O is an output device. Selection of input or output ports is under CPU control. Timing and signals on the universal I/O card may be controlled by an on-board clock timer chip (CTC) 51.

The universal I/O card provides a first level of decoding to access the protection function cards, test circuitry. The second level of decoding is provided by the card select monitors 54 (FIG. 7, discussed below).

In general, to communicate with a protection function card, its card select monitor 54 must first be selected. Address data is then shifted through the universal I/O cards to the card select monitor to select a particular protection function card located in a particular slot of the card file under control of the selected card select monitor.

Once the protection function card is selected, the data necessary to configure it to test the RPS is provided via the data bus. The data is routed across the bus from the universal I/O card directly to the selected functional card and does not pass through a card select monitor.

The card select monitor is an interface between the universal I/O cards and the protection function cards and provides a second level of address decoding. The universal I/O card can select one of up to 24 card select monitors. Generally, 24 card select monitors per universal I/O card are not required, but the capacity is available for certain embodiments of the invention.

The card select monitor is "selected" by the universal I/O when it receives a system select signal from the universal I/O card (FIGS. 10a–c). The universal I/O sends a particular test address vector (input data) to the card select monitor after the card select monitor is selected. The test vector selects the particular card in the card file to receive test data from the CPU. A 27-bit word is received from the universal I/O at the card select monitor as serial data. The serial data is shifted into an address register 55 by means of an address clock. Each bit of data shifted in refers to a particular protection function card that may be selected. Thus, if a '1' is shifted in at bit position 7, then the seventh protection functional card in that card file is selected.

A select strobe signal is sent to the card select monitor causing serial data that has been shifted into the card select monitor address register 55 to be latched in the card select monitor output register 56. This output register now actuates the card select line for the desired protection function card in the card file.

One of the important features of the present invention is that of verification and acknowledgement. Thus, when a select strobe signal is sent to latch data into the output register, a strobe echo is returned to the universal I/O, verifying that the card select monitor indeed received the select strobe signal. Likewise, when a system select signal is provided to the card select monitor, a system acknowledge signal is routed back to the universal I/O to confirm that the system select signal reached the card select monitor.

The card select monitor can be used to inventory the functional cards in a given card file to determine if there are any missing or added cards in the file. In order to do this, patterns are latched into the output register to select every functional card in the card file. An echo from each functional card is returned to the card select monitor and latched into monitor register 57. Upon receiving a compare clock signal from a universal I/O, the parallel data in the monitor register indicating echos from the selected functional cards is latched and then serially shifted out of the monitor register and back to a universal I/O.

The pattern received by the universal I/O is checked by the CPU to be certain that echos from all cards are received and that no cards are out of file. In addition to performing a functional card inventory, this procedure is used during actual testing to verify that the correct functional cards for a particular test pattern have been selected.

Due to the complexity of a nuclear reactor, many component portions of the nuclear reactor protection system must be tested in separate, overlapping system tests. In this particular embodiment of the invention seven different protection systems are tested in this manner. FIG. 8 shows a typical functional or logic test card used in the present invention. From a self-testing point of view, the card shown is substantially similar to all other protection function cards, although certain modifications may be necessary for particular applications. The protection function card is selected when a test vector specifying that particular card is decoded by the card select monitor which, in turn, selects the appropriate protection function card in its associated card file.

Some protection function cards may have more input or output registers but most are configured similarly. Typically, signals present at all protection function cards are those of the self-test bus which include data-in, clock, test pulse, test pulse echo, card select, card select acknowledge, and compare clock.

When a functional card is selected by the card select monitor, a card select signal is routed to the card to set one-half of 'AND' gate 62. An echo or card select acknowledge is provided to the card select monitor to verify that the card select signal has reached the functional card.

Whenever, the card select signal and the clock signal are present at 'AND' gate 62, the serial, "data-in" may be shifted into data input register 63 via the data bus (FIG. 11a). Thus, a test vector is shifted into the data input registers bit-by-bit to set up various test patterns.

After the functional card is selected by the card select monitor and the test vector is shifted into the data input register, a one millisecond test pulse is provided (FIG. 11b). A test pulse echo is sent back to the universal I/O to verify that the test pulse reached the selected functional card.

Approximately 800 microseconds after the test pulse first issues, a compare clock signal is provided to the functional card. The compare clock signal latches parallel data output from the tested reactor protection system (RPS) into received pattern register 64. The parallel data latched into the received pattern register are serially clocked out (FIG. 12) bit-by-bit by the clock signal. This returns serial data to a universal I/O.

The data input to the functional card are typically dependent on the actual number of functional inputs the card has and the results data are dependent on the number of outputs. In addition to the test result data, the protection function card data provides two additional types of information: card type data and card address data.

The card type data identify a protection function card as to its particular performance characteristics. Thus, in the example shown, five of the inputs of shift register 65 are uniquely connected to indicate the protection function card's type.

To insure that the card selected is located in its proper slot, a card address portion is also provided with the serial data output from the functional card. Thus, two inputs of shift register 65 and four inputs of shift register 66 are connected to a jumper arrangement. As shown in FIG. 4, each bit of the card address (A0–A5) may be jumpered high or left low. Thus, for card A125 (60) in FIG. 4, bits A0, A3 and A4 are jumpered to high to provide a unique binary number indicative of the particular slot which the functional card is occupying.

The Z80 CPU receives the protection function card output data, card type information, and card address information from the universal I/O. The values obtained for the test are compared with expected values for the test stored in the data base. If the test results match the expected results, the test program goes to the next test. If the results do not match, an indication of inconsistency is annunicated to plant operating personnel.

The accuracy of the test is maintained by verifying that the card address and card type are proper prior to verifying that the received data matches the expected data. If an improper card type or card address is detected, an alarm is annunciated to the operating personnel so that corrective measures may be taken.

The particular functional card selected depends on which RPS test is performed. During certain tests it is desirable that a protection function card remain unselected but continue to provide an output monitor function. Such a situation might arise when a card is not directly loaded with test data from the STS but rather is indirectly loaded from cards undergoing direct testing at different points in the reactor protection system. For example, this may happen in end-to-end testing where a certain condition is input to one of a set of cards performing a given system function and the outprint from a second card is monitored. For example, in a system test that requires performance from ten protection function cards, five protection function cards might be configured as monitor cards; while the other five might be configured for data injection. In such test configuration, the card select monitors select each protection function card to be injected one at a time. Test vector data for the particular test are then shifted into each card's data input register.

Once the protection function cards are conditioned for the test, the system goes back and selects the five protection function cards that are to inject a test signal into the RPS. During the actual test each selected protection function card simultaneously receives the one millisecond test pulse. The one millisecond test pulse period is quite significant for test purposes because it provides sufficient time to check the integrity of the RPS control loops, but it does not seize the RPS control loops long enough to actually affect protection system operation. In this way, the self-test system appears transparent to the nuclear reactor protection system and the protection system may be continually tested in real time while it is operating, without interfering with reactor operation.

To avoid a cumulative test effect on nuclear system operation, the one millisecond test pulse does not generally occur more often than once in every 33 milliseconds. Hardware and software timers are provided to prevent this occurrence. Additionally, protection function card circuitry is provided with a time constant such as time-out circuit 61 to further prevent test interference with nuclear system operation.

The protection function cards may be characterized as having test circuitry, as shown in FIG. 8, and as having functional or "essential" circuitry, as shown in FIG. 9. Essential circuitry is that which is connected to the actual RPS system and, as such, classified by various government standards as essential to the safe operation of the nuclear reactor. Thus, if there is a failure in essential circuitry the potential exists for interference with normal plant operation and the reactor is then put in a shut down or reduced power condition until the error is corrected. Most circuitry in the present invention is of the nonessential type. Thus, a failure of the present invention would not necessarily be cause for shutting down a reactor.

The circuitry shown in FIG. 9 is essential circuitry in that it is an actual part of the reactor protection system. Referring now to FIG. 9, a card select and deselect are provided through AND/OR gate 70. The select function is under the control of the circuitry shown for the protection functional card in FIG. 8. The circuitry in FIG. 8 is in turn under the control of the card select bus.

The one millisecond test pulse is provided to the essential circuitry through buffer 71. It should be noted that FIG. 9 discloses two identical essential circuitry test circuits, 68 and 69. These particular circuits are "load driver" circuits such as are connected to remotely located devices and actuators, e.g., scram solenoids.

For the particular test performed in this illustrative example the data is provided in the form of an oscillating signal (OSC). At 'AND' gate 73 the data input is 'ANDed' with the functional signal to operate field effect transistor (FET) switch 74. A timer 75 having a time constant controlled by capacitor 23 maintains a proper select/deselect interval during the actual test.

In this particular test circuit, the test pulse provides a current source that senses loop current present in transformer T7. Current sensed is compared with a preset current level at comparator 76 and provided as output data on the data bus.

Testing of the nuclear reactor protection system is accomplished by a series of short duration pulses, on the order of one millisecond, injected into the protection system logic such that no single test pulse is of significant duration with respect to the response time of the functional system and so that combinations of test pulses do not alter system performance.

The chief method of testing is to control all RPS control cabinet inputs for a particular functional safety system and to observe all cabinet outputs. These outputs are compared to the known transfer function of the particular system for all significant combinations of the input condition in order to establish that the circuit is operable. To minimize test time, each of the functional safety systems—in this embodiment of the invention, seven safety systems—is subdivided into circuits having independent inputs and outputs so that they can be tested separately. Overlap testing is employed to minimize test time and facilitate localization of fault to a replacable module (circuit card). Faults are located to the module level which is a preferred increment of field replacement. Replacement modules are separately verified as operable to a high confidence level.

Testing with the self-test system is automatic, once it has been initiated, to assure a consistent and minimized test interval. Manual testing is performed to check a newly replaced module.

The self-test system is microprocessor controlled, the microprocessor operating from a series of software modules. For purposes of better understanding, a microfilmed copy of the self-test system computer program is included as a Microfiche Appendix to this document. Program organization is shown in FIG. 13.

The main software module is the executive module, the main program loop in each of the four redundant divisions. The executive checks for messages from the plant process computer, other divisions, and the analog trip module (ATM) control card via communicating links, and during certain periods of operation. When a given division's self-test system reaches its turn to exercise control over all divisions, i.e., becomes the master, its executive directs those tests assigned to it.

The tests to be run are found using a counter as an index into a test table. The test located at that index is then called. The test run then returns a code describing the test results. On a test failure, the self-test system division is taken off line. When all the major tests have been run, the race flag is set, and the race for master routine is called to hand off the master status to another self-test controller (STC).

The watch-dog routine is called when the watch-dog timer is timing the initialization of a new master. The watch-dog timer checks that the allotted time for this initialization has not been exceeded; if it has, the watch-dog routine enters the proper message in the error log and jumps to a routine that annuciates the error and stops the testing.

Operation of the executive loop is shown on the flow chart of FIG. 14. When the system is brought up, a power up initialization (100) is performed and an on-line and race flag is set (101). The program then looks for messages from other divisions (102), decodes them and executes the necessary responses (103) if such messages are present. The division also looks for messages from the process computer (104), decodes them, and executes the necessary responses, if they are present (105). If no messages are encountered or when all the messages have been answered, a dead man timer is reset (106) and the executive program checks to see if any division is currently a master (107).

If the division is not on-line, it remains in the executive loop watching for messages from other divisions (102). If the division is on line, then a race for master flag must be checked (108). If the race for master flag is set, the race for master routine is called (109) and the race for master is executed to determine which of the four divisions will be master and, by default, which will be slaves.

If the race for master flag has not been set, there is already a master and the executive checks to see if its division is a master (110). If its division is not a master, the watch-dog timer flag is checked (111) and is set at that point (112). If the division is a master, the executive goes to the program tables, gets the major and minor test numbers (113), and calls the major tests first (114) (discussed below).

If the major tests are passed (115), the minor test numbers are incremented (116). If the tests are not passed, or if there is a watch-dog timer time out interrupt (indicating that a division is hung up), a record of the error is made in the error log (123), an annunciator is turned on, the on-line flag is reset (122), and a race for master flag is reset (121).

If the minor tests are successfully finished, the minor test number is reset, the major test number is bumped (117), and the interdivisional tests are then performed (118). If the interdivisional tests are passed, the executive checks to see if all major tests are finished (120) and, if so, sets the race for master flag (121). If not, the executive returns to the beginning of the loop.

If the interdivisional tests are to be performed (118), the executive checks for an interdivisional configuration (more than one division) (119). If the system is configured for several divisions, a test is made to see if all major tests are finished (120) and, if so, the race for master flag is set (121). If there is not an interdivisional configuration (119) the system loop goes directly to the race for master routine (121) and then, to the beginning of the loop (102).

The following is a discussion of the major tests and routines peformed by the system software under control of the executive loop. The first test is the self-checking routine.

The self-checking routine does a self check of the self-test controller's CPU which includes a test of the Z80 microprocessor, ROM memory, RAM memory, and the counter/timer circuit. These tests are executed sequentially and, should a failure be detected, the processor is halted. If all tests are successful, a normal return occurs.

During the self checking routine a Z80 microprocessor check is performed. The microprocessor check has two major components: program control test and pattern manipulation tests. Interrupts to the microprocessor are disabled for this test. If any failures occur in the process of the test, a halt occurs.

The program control test exercises the program instructions of the Z80 instruction set. The pattern manipulation tests provide various parity checking procedures.

The RAM test routine tests the top part of the RAM for operation and then moves the portion of RAM data that must be saved up to the top portion just tested. The routine then tests the bottom portion of the RAM. When the test is completed, the portion of RAM data saved is moved back to its original location.

The next routine is the self-test routine. The self-test routine contains a series of subtests, each of which tests a part of the self-test controller hardware. These subtests are executed in the order that follows below, the results of a subtest are not valid until all the proceeding subtests have passed.

During the self checking and self testing procedures a watch-dog timer routine is executed in each division. Typically, the watch-dog timer is used when a given division has finished its testing and is about to pass off its master status to another division. The retiring division sends an inquiry to the master-to-be. The master-to-be begins its self-testing and self-checking procedures. The retiring master times these procedures with its watch-dog timer and, if the tests are concluded within the allocated time, the retiring division passes master status to the master-to-be. The latter then proceeds with system testing.

Additionally, each division maintains a dead man timer for the master division. Should the master not complete the its RPS testing in its allotted amount of time, an error flag is set and the fault is annunciated. Such annunciation indicates that the master division is hung up at some point but has not yet annunciated the fact itself.

If a failure is detected in any of the following subtests of the self-test routine, the error is logged with the executive. The following tests are part of the self-test:

(1) Counter timer circuit test;
(2) Universal input/output test;
(3) Power monitor test;
(4) Card selector/monitor test;
(5) Card out of file test;
(6) Card address test;
(7) Bus fuse test; and
(8) Time delay card test.

The test sequence incorporating the above routines and the individual functional watch test routines are as follows.

When a self-test controller becomes a master, it first tests itself before testing the protection circuitry. It does this in two phases: a self-check phase, which tests the CPU function, ROM and RAM, and the hardware counter/timer circuit; and a self-test phase, which tests the universal I/O ports and all other self-test control or interface circuitry.

If a problem is enountered during the self-check phase, the CPU is halted and no further test activities are undertaken by that division. However, during this period a watch dog timer in the division that has just previously served as a master is timing out. If the new master doesn't make it through self-check, the retiring master logs that fact in its error log and activates the self-test controller fault annunciator. Thus, during this critical phase of tester self-check, another self-test controller—in particular, a self-test controller which has just validated its operability by having successfully tested its own division—is watch dogging the process.

If a problem is encountered during the self-test phase, card type and location are reported in the division error log and a self-test controller fault annunciator is activated.

In more detail, self-testing begins with a test of the counter timer circuits found on the universal I/O cards. These timer circuits are used to do timing functions, such as the watch-dog timer function and the slave keep-alive function. The timers are also used to time test pulse intervals and duty cycles; when a division communicates with another division, a counter is started and a timer is started if that other division does not respond.

Once the timers are all exercised and verified to be operating properly, the universal I/O test is performed. In this particular embodiment six universal I/O cards are tested. There are basically three types of I/O card tests: the quiescent state test, in which all output points are disabled to make sure that the input ports are at an appropriate logic level; the tri-state isolation test, in which it is verified that the output circuitry of the card is turned off when the command to turn it off is given; and the wraparound test, in which all '0s' are written into the input ports of the universal I/O cards, and the system checks to make sure that all '0s' are returned by the output ports. The wraparound test is then run with all '1s' and the system checks for all '1s' being written back; the test is also run with alternate '1s' and '0s' to make sure that the same alternation is written back. The wraparound test verifies that there are no shorts or broken input or output ports.

The next test is the power monitor test which retrieves the data in the register on the power monitor cards (not shown). This test verifies that the power monitor cards are reporting the status of each of the power supplies in proper format.

The card select monitor test does an inventory of card select monitor cards as discussed above. Following this test is the card out-of-file test that assures that a proper echo is returned from each card select monitor.

The next test is the card address test which verifies that the card select monitor cards are in their proper card files and in the proper slots of these card files. Additionally, this test checks the address of the card select monitor.

The bus fuse test checks the bus fuses in every system to make sure that when the card uses all the voltages necessary to observe the STS a proper reading is made. If an inconsistent result is obtained, a fuse failure is to be suspected.

The last test is the time delay card test. This test verifies that each time delay in the self-test system is within specifications.

Following the self-check and self-test phases, the self-test controller is ready to perform tests on the actual protection circuitry. These tests take two general forms: system tests (FIGS. 15 and 16) and interdivisional tests.

In system testing, each major RPS system is broken down into a number of subsystems and tested separately with due regard for overlap so that there are no untested "islands" within the division. Any failure that is detected causes the test sequence to stop and a fault isolation routine to be automatically initiated. The fault isolation routine has as its objective the finding of an individual card fault or card with an associated input signal path fault. The routine can distinguish which is which. Once found, localization faults are logged in the error log, the safety system in the division in which the fault occurred is annunciated, and a fault annunciator is activated.

At the start of a systems test (200) (FIG. 15) the system pointer is initialized to a system card table system and pattern table to a '1'. An entry in the system card table is read (202) and the test is made to determine if the end of the system card cable has been reached (203). If the end of the system card table has not been reached the system test determines if the card is an injection card or a monitor card (204). A monitor card does not inject data into the RPS system. The pointer in the system card table is incremented (210) and the routine loops back to reading the card table (202). If the end of the card table is reached (203), then all inject cards loaded with injection patterns are called (205).

The injection pattern is obtained from the individual card tables (207) and the injection bits are obtained from the system pattern table and increment pointer (208). The routine then calls a routine that loads the injection bits into the cards (209). The pointer and the system card table are then incremented (210). Because the test sequence has reached the end of the system card table (203), the system returns to the next major routine (206) when the present test is finished.

When the end of the system card table is not yet reached (203), and the card is an injection card (204), the routine for obtaining the injection patterns and bits and for performing the injection (207 through 208) is called.

The interdivisional tests are performed in a very similar way except that they involve sending test signals across divisional boundaries in order to check the interdivisional electrical optical isolators and associated circuitry. Timing is critical in this operation, so a suitable handshake signal between divisions is included to minimize the problem. All information pertaining to which cards are to be injected and what test patterns are to be used is derived from the data base of the division that initiated the inter-divisional test. Communication is via the division's serial I/O cards.

It should be noted at this point that many of the RPS system tests are redundant. A critical test might involve the functional cards of all four divisions. To perform such a test the cards in the master division are configured as discussed above. The cards in the slave division are configured according to data sent from the master division's serial I/O to each selected slave division. All slave divisions cooperating with the master division during a particular test use the master's data and, therefore, cannot introduce any errors based on faulty or inconsistent data they themselves may have generated.

An RPS fault check routine is shown in the flow chart of FIG. 16. At the start of the routine (300) the pointers to system card table and system pattern table are initialized (301). An entry in the system card table is read (302) and, if the end of the table is encountered (303), the routine returns to the main routine indicating no system fault (304).

If the end of the table is not encounted (303) the system determines if the card is a system fault card (305). If the card is not a system fault card, the pointer in the system card table is incremented (306) and the loop continues (302). If the card is a system fault card, the length of the monitor bit pattern is obtained from the individual card table (307). The monitor data obtained from the functional card hardware (308); the monitor bits are obtained from the system pattern table (309). The pointer is incremented at this point.

Data obtained from a test are compared with data in the tables (310). If the test is successful, the pointer is incremented (306) and the loop continues. If the data comparison indicates a failure or system error, the test routine returns to the main routine and indicates a system fault (311).

In interdivisional testing, fault reporting and error logging are handled similarly to the system tests, except that an inherent ambiguity exists. Typically, interdivisional faults are caused by optically coupled isolators, in which case the self-test system is not able to distinguish whether it is the input or output isolator that is at fault. Both possibilities are reported to the test technician via the diagnostic terminal.

If no faults are encountered in either the systems or interdivisional tests, the retiring master initiates a race for master with the other three divisions. Under normal conditions, the next division in numerical sequence wins the race and becomes the next master, thereby setting the other divisions to slave status.

The self-test controller firmware is composed of software modules, each having a distinct functional purpose. Data is passed between the modules in the form of direct parameters and system flags and tables. All information relating to specific tests is contained in a table oriented data base. The self-test systems test and interdivisional test handlers are essentially parsing interpreters which read the data base and determine what tests to perform and how to perform them.

The purpose of the system test is to provide diagnostic testing of all cards which contain safety circuitry. The basic philosophy behind the system test is to perform end-to-end testing for each signal entering and leaving the division. For example, to produce a particular output signal, all input stimuli effecting the signal are injected and the response monitored. The procedure is repeated with different test vectors as many times as necessary to ascertain correct circuit performance. If a failure is detected, the program isolates the failed card or signal path. This is accomplished by individually testing all the cards in the system. If this test passes, the fault lies not in a card but in a signal path between cards. To determine just where, all predecessor cards to the system output card indicating a fault are checked in order of sequence.

Because of the importance of the safety functions performed by the nuclear system protection system any effects on it by the self-test system, either under normal operation or under hardware failure conditions, must be miminized. In order to insure maximum possible separation of the self-test system from the nuclear system protection system (essential circuitry), the following steps have been taken:

(1) The self-test computers run on their own power supply and power sources. They are housed separately from functional circuits and a minimum of one-inch separation between functional and computer wiring is maintained;

(2) Communication between divisional panels is through optically coupled isolators with one-inch quartz rods providing mechanical separation; and (3) Injected pulses are capacitively coupled to minimize changes in static voltage levels. Impedances between self-test circuits and functional circuits and are kept high so that fault in the former cannot effect the latter.

Although one embodiment of the invention has been described, it will be apparent that many variations may be made to the invention without departing from the scope of the appended claims, which are intended to more fully characterize the invention. Therefore, the scope of the invention should be limited only by the breadth of the following claims.

We claim:

1. A self-test system for a nuclear reactor protection system (RPS), comprising:
    a processor for generating a series of RPS test pattens and test vectors, said processor including a series of related expected test results;
    a plurality of self-test elements coupled to said processor for receiving said test vectors and adapted to receive and store related actual test results from the RPS;
    first means responsive to commands from said processor for selecting from said self-test elements those self-test elements corresponding to said RPS test patterns;
    second means responsive to commands from said processor for generating a short duration test pulse which is transmitted along the actual RPS operating path without causing an RPS response, and adapted to effect injection of said test vectors into the RPS by said self-test elements;
    means coupled to said self-test elements for monitoring said actual test results and coupled to said processor for comparing said actual test results with said expected test results; and
    means coupled to said monitoring and comparing means and for indicating differences between said actual test results and said expected test results.

2. The self-test subsystem of claim 1, further comprising means for locating RPS origin of said differences between said actual test results and said expected test results.

3. The self-test subsystem of claim 2, further comprising means for indicating said origin location.

4. The self-test subsystem of claim 1, wherein said means for selecting from said self-test elements comprises a decoder.

5. The self-test subsystem of claim 4, wherein said decoder further comprises an input/output card, said input/output card including a processor controlled input port and a processor controlled output port, both ports coupled to said self-test elements.

6. The self-test subsystem of claim 5, wherein said decoder further comprises a self-test element select/monitor card.

7. The self-test subsystem of claim 1, wherein said self-test elements comprise a plurality of protection function cards.

8. The self-test subsystem of claim 1, further comprising self check means for testing operation of said processor.

9. The self-test subsystem of claim 1, further comprising self-test means for testing operation of said self-test subsystem.

10. In a nuclear reactor protection system (RPS), a protection function circuit card for a self-test subsystem, comprising:
    a first register for receiving RPS test vectors;
    a second register for storing actual RPS test results;
    means for isolating a self-test circuitry component of said protection function circuit card from an RPS essential circuitry component of said protection function circuit card while maintaining communication therebetween;
    means adapted to inject said RPS test vectors into the RPS via said protection function circuit card essential circuitry along the actual RPS operating path during a short duration test pulse period so that said test vector will not cause an RPS response, said data simulating a selected actual RPS condition;
    means for providing said second register with said actual RPS test results;
    means for interfacing said protection function circuit card with a self-test subsystem bus;
    first means for acknowledging receipt at said protection function circuit card via said bus of a protection function circuit card select command from said self-test subsystem; and
    second means for acknowledging receipt at said protection function circuit via said bus of an RPS test pulse command from said self-test subsystem.

11. In a nuclear reactor protection system (RPS), a self-test subsystem, comprising:
    a self-test system controller including:
        (a) a central processing unit including a self-test operating program;
        (b) memory means for storing said operating program;
        (c) random access memory means for storing RPS test patterns and test vectors;
        (d) a self-test subsystem bus for communicating system control information, test data, and system address information to and from said central processing unit;
        (e) a first input/output port for interfacing said central processing unit to a plurality of RPS self-test elements via said self-test subsystem bus; and
        (f) a second input/output port adapted to communicate between said self-test subsystem, additional self-test subsystems, and RPS diagnostic systems; and
    a protection function circuit card including:
        (a) a first register for receiving said RPS test vectors;
        (b) a second register for storing actual RPS test results;
        (c) means for isolating a self-test circuitry component of said protection function circuit card from an RPS essential circuitry component of said protection function circuit card while maintaining necessary communication therebetween;
        (d) means adapted to inject said RPS test vectors into the RPS via said protection function circuit card essential circuitry along the actual RPS operating path during a short duration test pulse period so that said test vectors will not cause an RPS response, said data simulating a selected actual RPS input condition;
        (e) means for providing said second register with said actual RPS test results;
        (f) means for interfacing said protection function circuitry card with said self-test subsystem bus;
        (g) first means for acknowledging receipt at said protection function circuit card via said bus of a protection function circuit card test pattern command from said self-test system controller; and
        (h) second means for acknowledging receipt at said protection function circuit card via said bus of a RPS test pulse command from said self-test controller.

12. The self-test subsystem of claim 11, further comprising:
a plurality of self-test controllers interconnected and intercommunicating via said second input/output port;
said self-test controllers including a protocol wherein a series of test patterns corresponding to a complete RPS test are generated by one master self-test controller, said other self-test controllers being slaves; and
wherein said master self-test controller is configured as a slave controller at the completion of said RPS test and one of said slave self-test controllers is configured as a new master to repeat the RPS test pattern.

13. A protection function card for insertion in the actuating circuitry of a nuclear reactor protection system (RPS) including a control input for actuating and controlling an actual operating path along said card and for transporting an RPS actuating signal to an RPS output signal from said RPS in combination with said card, comprising:
first registers for receiving card inputs for actuating the actual operating path along said car responsive to a test signal;
input means for said register to receive a first strobe signal to cause the release of test signal data loaded in said first registers on a simultaneous basis through the actual operating paths of said card during a short duration test pulse period transparent to RPS operation;
output registers responsive to a compare signal for monitoring the state of said cards and latching the operative state of said cards at said operating paths; and
means for releasing card state data from said output registers to output the status of said cards responsive to a second strobe signal.

14. The system card of claim 13, wherein said test signal is serially loaded to said card.

15. The system card of claim 14, wherein said card state data are serially unloaded from said card.

16. A self-test system for a nuclear reactor protection system (RPS), the RPS being located intermediately between a sensor and a sensor annunciator, the RPS responding to said sensor and actuating said annunciator, the RPS including a communicating path between said sensor and said sensor annunciator, said path including a plurality of discrete cards having a portion of the path thereon, said self-test system comprising:
input registers on said cards for receiving, at preselected points along said path, data for strobing said path;
timing means for timing data strobes on said path from said registers, said timing means having a time domain less than the actuating intervals of said path;
means for causing said timing means to release a strobe from at least one of said cards;
output register means operatively connected to the system communicating path portion of said cards for reading the state of said cards;
register strobe means operatively connected to said timing means for reading said cards upon a reading strobe;
a system controller;
means for unloading said output register means to said system controller; and
comparison means in said system controller for comparing the actual status of said output register means to an expected memory status to determine operability of said actuating path.

17. In a nuclear reactor protection system (RPS) wherein sensors communicate electrically to sensor annunciators along an real actuating electrical path, said path including discrete components isolated to discrete electronic units, a process for testing the RPS comprising the steps of:
(a) providing registers at the discrete components of said system path for receiving strobe commands and RPS test data;
(b) loading said registers with said test data in response to said strobe commands;
(c) releasing said strobe data along said real actuating path during a time domain based at intervals transparent to the command domain of said RPS;
(d) providing RPS status registers;
(e) reading said RPS status registers at predetermined intervals after said strobe to determine the state of said RPS; and
(f) comparing said RPS status registers with expected data, indicating the operability of the tested portion of said RPS real actuating path.

18. The process of claim 17, further comprising the step of:
(g) locating RPS origin of any differences between said RPS status registers and said expected data.

19. The process of claim 17, wherein said time domain is one millisecond.

20. The process of claim 19, further comprising selecting, in accordance with said test patterns, self-test elements to receive said test vectors.

21. The process of claim 20, further comprising providing registers in association with said self-test elements for receiving said test vectors.

22. The process of claim 20, further comprising providing registers in association with said self-test elements for storing said RPS state.

23. The process of claim 20, further comprising injecting said test vectors into the RPS via said self-test elements.

24. The process of claim 19, further comprising locating RPS origin of said differences.

25. The process of claim 24, further comprising indicating said origin location.

26. The process of claim 20, further comprising selecting said self-test elements on a one-by-one basis.

27. In a nuclear reactor protection system (RPS), a self-test subsystem process for interpreting communications sent from a self-test system controller to a protection function circuit card comprising:
providing a first register for receiving RPS test vectors;
providing a second register for storing actual RPS test results;
isolating a self-test circuitry component of said protection function circuit card from an RPS essential circuitry component of said functional circuit card while maintaining communication therebetween;
injecting said RPS test vectors into the RPS via said protection function circuitry card essential circuitry along the actual RPS operating path during a short duration test pulse period so that said test vectors will not cause an RPS response, said test vectors simulating a selected actual RPS condition;

providing said second register with said actual RPS test results;

interfacing said protection function circuit card with a self-test subsystem bus;

acknowledging receipt at said protection function circuit card via said bus of a protection function circuit card select command from said self-test subsystem; and acknowledging receipt at said protection function circuit card via said bus of an RPS test pulse command from said self-test subsystem.

28. The self-test system of claim 1, further comprising:

at least one additional self-test system for testing a redundant RPS;

means for monitoring the operation of said additional self-test system; and means for commencing operation of said self-test system when said monitoring means indicates completion of testing by said additional self-test system;

so that only one RPS is being tested at any one time.

29. The self-test system of claim 29, further comprising:

means for optically coupling said self-test system to said additional self-test system so that electrical failure of one such system will not affect the other such system.

* * * * *